United States Patent
Koshika et al.

(10) Patent No.: US 9,859,562 B2
(45) Date of Patent: *Jan. 2, 2018

(54) POSITIVE ELECTRODE MIX

(71) Applicant: IDEMITSU KOSAN CO., LTD., Chiyoda-ku (JP)

(72) Inventors: Hiromichi Koshika, Sodegaura (JP); Hiroyuki Higuchi, Sodegaura (JP); Takayoshi Kambara, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 196 days.

This patent is subject to a terminal disclaimer.

(21) Appl. No.: 14/411,649

(22) PCT Filed: Jun. 25, 2013

(86) PCT No.: PCT/JP2013/003965
§ 371 (c)(1),
(2) Date: Dec. 29, 2014

(87) PCT Pub. No.: WO2014/002483
PCT Pub. Date: Jan. 3, 2014

(65) Prior Publication Data
US 2015/0162614 A1 Jun. 11, 2015

(30) Foreign Application Priority Data

Jun. 29, 2012 (JP) ................. 2012-147049

(51) Int. Cl.
*H01M 4/62* (2006.01)
*H01M 4/136* (2010.01)
*H01M 10/0525* (2010.01)
*H01M 10/0562* (2010.01)
*H01M 4/13* (2010.01)
*C01B 17/22* (2006.01)
*H01M 4/38* (2006.01)
*H01M 10/052* (2010.01)
*H01M 4/02* (2006.01)
*H01M 4/40* (2006.01)

(52) U.S. Cl.
CPC ............ *H01M 4/62* (2013.01); *C01B 17/22* (2013.01); *H01M 4/13* (2013.01); *H01M 4/38* (2013.01); *H01M 10/0525* (2013.01); *C01P 2006/80* (2013.01); *H01M 4/136* (2013.01); *H01M 4/382* (2013.01); *H01M 4/405* (2013.01); *H01M 10/052* (2013.01); *H01M 10/0562* (2013.01); *H01M 2004/028* (2013.01); *H01M 2220/10* (2013.01); *H01M 2220/20* (2013.01); *H01M 2220/30* (2013.01); *H01M 2300/008* (2013.01); *H01M 2300/0068* (2013.01)

(58) Field of Classification Search
CPC .......... H01M 10/052; H01M 10/0525; H01M 10/0562; H01M 2004/028; H01M 2220/10; H01M 2220/20; H01M 2220/30; H01M 2300/0068; H01M 2300/008; H01M 4/13; H01M 4/136; H01M 4/38; H01M 4/382; H01M 4/405; H01M 4/62; C01B 17/22; C01P 2006/80
See application file for complete search history.

(56) References Cited

U.S. PATENT DOCUMENTS

| | | | |
|---|---|---|---|
| 4,477,545 | A | 10/1984 | Akridge et al. |
| 2003/0031931 | A1 | 2/2003 | Obrovac et al. |
| 2007/0160911 | A1 | 7/2007 | Senga et al. |
| 2009/0159839 | A1 | 6/2009 | Seino et al. |

FOREIGN PATENT DOCUMENTS

| | | | | |
|---|---|---|---|---|
| CA | 2 854 596 | A1 | 5/2013 | |
| JP | 59173979 | A | * 10/1984 | |
| JP | 60-501729 | A | 10/1985 | |
| JP | 6-275315 | A | 9/1994 | |
| JP | 6-275322 | A | 9/1994 | |
| JP | 2005-228570 | A | 8/2005 | |
| JP | 2010-30889 | A | 2/2010 | |
| JP | 2010-95390 | A | 4/2010 | |
| JP | 2010-163356 | A | 7/2010 | |
| JP | 2012-104279 | A | 5/2012 | |
| WO | WO 2007/066539 | A1 | 6/2007 | |
| WO | WO 2010/125467 | A1 | 11/2010 | |
| WO | WO 2012/026238 | A1 | 3/2012 | |
| WO | WO 2012/026238 | A1 * | 3/2012 | ........ H01M 10/0525 |
| WO | 2012/086196 | A1 | 6/2012 | |
| WO | WO 2012/101501 | A1 * | 8/2012 | ............ H01M 4/04 |
| WO | WO 2013/069243 | A1 | 5/2013 | |

OTHER PUBLICATIONS

Combined Chinese Office Action and Search Report dated Jul. 13, 2016 in Patent Application No. 201380034599.4 (with English translation of categories of cited documents).
Extended Search Report dated Jan. 29, 2016 in European Patent Application No. 13809624.3.
D. Ravaine, "Ionic Transport Properties in Glasses", Journal of Non-Crystalline Solids, vol. 73, No. 1-3, 1985, XP024065188, pp. 287-303.
Keiichi Minami, et al., "Mechanochemical synthesis of $Li_2S$—$P_2S$ glass electrolytes with lithium salts", Solid State Ionics, vol. 181, No. 33-34, XP027424759, 2010, pp. 1505-1509.
Hans-Jörg Deiseroth, et al., "$Li_7S$—$PS_6$ and $Li_6PS_5X$ (X: Cl, Br, I): Possible Three-dimensional Diffusion Pathways for Lithium Ions and Temperature Dependence of the Ionic Conductivity by Impedance Measurements", Z. Anorg. Allg. Chem. , 2011, vol. 637, No. 10, XP055188343, pp. 1287-1294.

(Continued)

*Primary Examiner* — Carlos Barcena
(74) *Attorney, Agent, or Firm* — Oblon, McClelland, Maier & Neustadt, L.L.P.

(57) ABSTRACT

A positive electrode mix including a solid electrolyte and a sulfur-based active material, wherein the solid electrolyte comprises a Li element or a Na element; a S element; and a halogen element selected from the group consisting of I, Br, Cl and F.

16 Claims, 3 Drawing Sheets

(56) References Cited

OTHER PUBLICATIONS

International Search Report dated Sep. 10, 2013 in PCT/JP2013/003965.
International Preliminary Report on Patentability and Written Opinion dated Jan. 8, 2015 in PCT/JP2013/003965 (submitting English language translation).
James R. Akridge, et al., "Solid State Batteries Using Vitreous Solid Electrolytes", Solid State Ionics, vol. 18-19, (1986), pp. 1082-1087.
Combined Taiwanese Office Action and Search Report dated Sep. 10, 2016 in Patent Application No. 102123214 (with English translation of categories of cited documents).
Office Action dated May 30, 2017, in Japanese Patent Application No. 2012-147049.
"Structure Analysis of Solid Electrolyte for Rechargeable Lithium Secondary Batteries" (Idemitsu technical report) Aug. 30, 2008, pp. 2-10.

* cited by examiner

POSITIVE ELECTRODE MIX

TECHNICAL FIELD

The invention relates to a positive electrode mix constituting a positive electrode of a lithium ion battery.

BACKGROUND ART

Recently, there is an increasing demand for a secondary battery or the like, which is used in PDA, a portable electronic device, a home-use compact power storage facility, an auto-bicycle powered by a motor, an electric vehicle, a hybrid electric vehicle or the like. In particular, there is a growing demand for a lithium-ion battery as a secondary battery with a high capacity.

Conventional lithium-ion batteries involve a concern of liquid leakage or danger of ignition, since it uses an electrolysis solution containing an organic solvent as an electrolyte. Therefore, a lithium-ion battery obtained by using a solid electrolyte that contains no solvent has made studied.

As a solid electrolyte, Patent Document 1 discloses a sulfur-based solid electrolyte, for example. This solid electrolyte has a high ion conductivity of $10^{-3}$ S/cm or more. The solid electrolyte is used not only in an electrolyte layer of a lithium-ion battery, but also in a positive electrode layer or a negative electrode layer in the mixture of an active material or the like.

Meanwhile, an all-solid battery used in an electric vehicle is required to have high performances such as a high capacity and a high output power.

As a positive electrode mix, a mixture of a sulfur-based solid electrolyte disclosed in Patent Document 1 mentioned above and an oxide-based positive electrode active material can be given, for example.

However, the oxide-based positive electrode active material does not have a high capacity. Therefore, even if it is possible to allow it to have a high output power, allowing it to have a high capacity has limitations.

For allowing it to have a high capacity, it is advantageous to use a sulfur-based active material, which has a large theoretical capacity. In Patent Document 2, a positive electrode material is prepared by mixing thio-lisicon $Li_{3.25}Ge_{0.25}P_{0.75}S_4$, that is one of sulfur-based solid electrolytes using sulfur as a positive electrode active material, and an all-solid lithium battery using the thio-lisicon $Li_{3.25}Ge_{0.25}P_{0.75}S_4$ as an electrolyte is evaluated for performance.

However, it cannot be admitted that it fully utilizes the capacity of sulfur. In addition, it has a disadvantage that the internal resistance is high and the discharge voltage is low. Another disadvantage is that the production cost is high due to the high cost of Ge.

RELATED ART DOCUMENTS

Patent Documents

Patent Document 1: JP-A-2005-228570
Patent Document 2: JP-A-2010-95390

SUMMARY OF THE INVENTION

In order to attain a high capacity and a high output, it is required to use a sulfur-based active material with a large capacity, as well as to decrease an internal resistance to increase a discharge voltage. The invention is aimed at providing a positive electrode mix capable of increasing a discharge voltage by using a sulfur-based active material with a large capacity.

According to the invention, the following positive electrode mix or the like can be provided.
1. A positive electrode mix comprising a solid electrolyte and a sulfur-based active material, wherein the solid electrolyte comprises a Li element or a Na element; a S element; and a halogen element selected from the group consisting of I, Br, Cl and F.
2. The positive electrode mix according to 1, wherein the solid electrolyte comprises a crystalline component.
3. A positive electrode mix which is produced by using a solid electrolyte precursor and a sulfur-based active material as a raw material, wherein the solid electrolyte precursor comprises a Li element or a Na element; a S element; and a halogen element selected from the group consisting of I, Br, Cl and F.
4. The positive electrode mix according to 3, which is obtained by subjecting a mixture comprising a solid electrolyte precursor and a sulfur-based active material to a heat treatment, wherein the solid electrolyte precursor comprises a Li element or a Na element; a S element; and a halogen element selected from the group consisting of I, Br, Cl and F.
5. The positive electrode mix according to 3 or 4, wherein
the solid electrolyte precursor further comprises a P element,
the heat-treated solid electrolyte obtained by subjecting the solid electrolyte precursor to a heat treatment has, in a $^{31}$P-NMR spectrum, a first peak in a first peak range of 75.0 ppm or more and 80.0 ppm or less, and
the ratio of the intensity of a peak which is in a range other than the first peak range and a second peak range of 86.0 ppm or more and 92.0 ppm or less relative to the intensity of the first peak is 0.5 or less.
6. The positive electrode mix according to 5, wherein, in the $^{31}$P-NMR spectrum, the heat-treated solid electrolyte has a peak in the first peak range and the second peak range, respectively.
7. The positive electrode mix according to 5 or 6, wherein the peak intensity ratio ($I_2/I_1$) of the intensity of a second peak ($I_2$) in the second peak range relative to the intensity of the first peak ($I_1$) is 1 or more and 10 or less.
8. The positive electrode mix according to any of 5 to 7, wherein the heat-treated solid electrolyte has an average of a hydrogen sulfide concentration according to a hydrolysis test of 200 ppm or less.
9. A material for a positive electrode mix comprising a material comprising a solid electrolyte and a material comprising a sulfur-based active material, wherein the solid electrolyte comprises a Li element or a Na element; a S element; and a halogen element selected from the group consisting of I, Br, Cl and F.
10. A positive electrode produced from the positive electrode mix according to any of 1 to 8.
11. A positive electrode comprising the positive electrode mix according to any of 1 to 8.
12. A lithium ion battery comprising the positive electrode according to 10 and 11.

According to the invention, a positive electrode mix capable of having a higher discharge voltage using a sulfur-based active material which has a high capacity can be provided.

A lithium ion battery obtained by using the positive electrode mix of the invention is highly safe and has a high discharge voltage.

MODE FOR CARRYING OUT THE INVENTION

Figure 1:
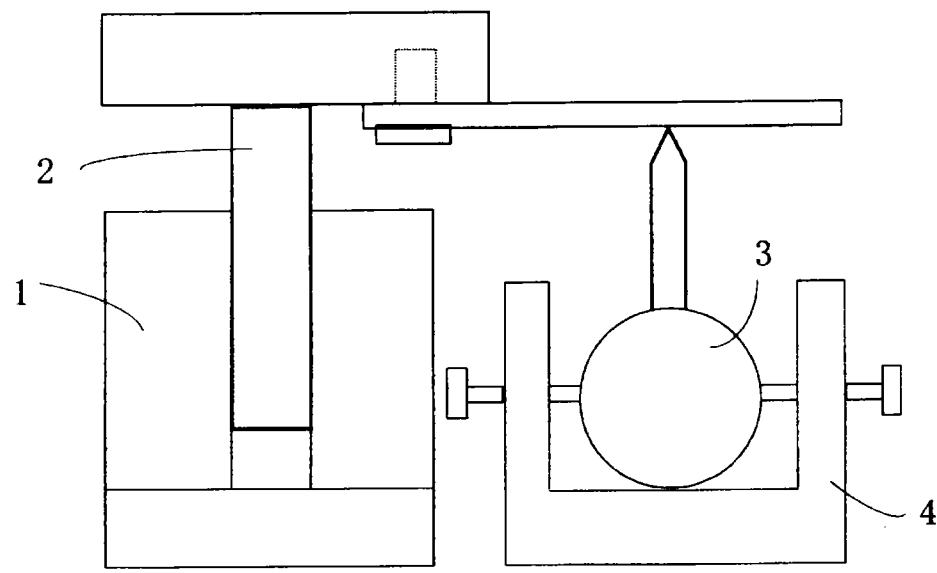
FIG. 1 is a schematic view for explaining the measurement of the space ratio $\epsilon_r$ associated with elastic recovery by means of an unconfined compression apparatus.

1. First Aspect of Positive Electrode Mix

A positive electrode mix of the first aspect of the invention comprises a solid electrolyte that comprises each element of lithium (Li) or sodium (Na) and sulfur (S) and; and a halogen element selected from the group consisting of iodine (I), bromine (Br), chlorine (Cl) and fluorine (F), and a sulfur-based active material.

Since a sulfur-based active material has a large capacity, a lithium-ion battery produced by using the positive electrode mix of the invention can have a high charge voltage.

(1) Solid Electrolyte

A solid electrolyte contained in the positive electrode mix of the invention comprises Li or Na; a S element; and a halogen element selected from the group consisting of I, Br, Cl and F. Here, the solid electrolyte contained in the positive electrode mix of the invention comprises a Li element or a Na element, and a S element as essential components, and further comprises a halogen element selected from the group consisting of I, Br, Cl and F. It is preferred that the solid electrolyte contained in the positive electrode mix of the invention comprise a Li element and a S element as essential components, and further comprise a halogen element selected from the group consisting of I, Br, Cl and F. It is more preferred that the solid electrolyte contained in the positive electrode mix of the invention comprise a P element. The solid electrolyte contained in the positive electrode mix of the invention may be amorphous or have a crystalline component. It is preferred that a solid electrolyte having a higher ion conductivity be selected by comparing the case in the amorphous state and the case where it has a crystalline component. Though there are no restrictions on the crystallinity, the solid electrolyte has preferably a crystalline component, and when the ion conductivity in the case of crystalline is higher, it is preferred that the crystallinity be high.

It is preferred that the solid electrolyte have an ion conductivity of $0.3 \times 10^{-3}$ S/cm or more. The ion conductivity is more preferably $0.5 \times 10^{-3}$ S/cm or more, further preferably $0.7 \times 10^{-3}$ S/cm or more, and most preferably $0.9 \times 10^{-3}$ S/cm or more.

It is preferred that the solid electrolyte have an average of a hydrogen sulfide concentration according to a hydrolysis test of 200 ppm or less. More specifically, it is preferred that when the solid electrolyte is left under a stream of wet air for 60 minutes, the average of a hydrogen sulfide concentration in the environment be 200 ppm by weight or less. The average is more preferably 150 ppm by weight or less, further preferably 100 ppm by weight or less.

For producing a positive electrode mix, it is required to mix a solid electrolyte and a positive electrode active material by the mechanical milling method or the like. In the solid electrolyte described in Patent Document 1, the both of a glass solid electrolyte and a glass ceramic solid electrolyte may be denatured by a mixing treatment. For this reason, the resulting battery may not exert the expected performances to decrease the discharge voltage. Moreover, the denatured glass solid electrolyte and glass ceramic solid electrolyte cannot return by a heating treatment or the like. Therefore, if an all-solid battery is made from the heat-treated electrolyte, it may provide only a low discharge voltage.

In the invention, a mix is produced by using a sulfur-based solid electrolyte comprising a halogen element. A battery produced by using this mix can provide a high discharge voltage.

In the specification of the invention, the glass solid electrolyte means a solid electrolyte having no peaks derived from crystals in its X-ray powder diffraction pattern. The glass ceramic solid electrolyte means a solid electrolyte having peaks derived from crystals in its X-ray powder diffraction pattern.

The halogen element in a solid electrolyte contained in the positive electrode mix of the invention is I, Br, Cl or F, and preferably I, Br or Cl.

The solid electrolyte preferably has a composition represented by the following formula (A). The solid electrolyte may be a composite or a mixture composed of two or more compounds each having a composition represented by the following formula (A).

$$L_a M_b P_c S_d X_e \quad (A)$$

In the formula (A), L is Li or Na. L is preferably Li.

M is an element represented by the following formula (B).

$$B_f Al_g Si_h Ge_i As_j Se_k Sn_l Sb_m Te_n Pb_o Bi_p Zn_q Cu_r Ga_s \quad (B)$$

In the formula (B), f to s are independently the composition ratio of each element. f, g, h, i, j, k, l, m, o, p, q, r and s are independently 0 or more and 1 or less, and f+g+h+i+j+k+l+m+n+o+p+q+r+s=1. The formula (B) represents one element or a combination of two or more elements selected from B, Al, Si, P, S, Ge, As, Se, Sn, Sb, Te, Pb, Bi, Zn, Cu and Ga.

In the formula (B), the case where i, j, k, l, m, n, o and p are 0, that is, $B_f Al_g Si_h$ (f, g and h are 0 or more and 1 or less, and f+g+h=1) is preferable.

Also, $Zn_q Si_h Ge_i$ (g, h and i are 0 or more and 1 or less, and q+h+i=1) is preferable.

In the formula (A), X is represented by the following formula (C).

$$F_t I_u Cl_v Br_w \quad (C)$$

In the formula (C), t, u, v and w are independently the composition ratio of each element. t, u, v and w are independently 0 or more and 1 or less, and t+u+v+w=1. The formula (C) represents one halogen element or a combination of two or more halogen elements selected from F, Cl, Br and I.

Preferable is the case where t and u are 0, that is, $Cl_v Br_w$ (v and w are independently 0 or more and 1 or less, and v+w=1). More preferable is the case where t, u and v are 0, that is, Br.

X is preferably one halogen element selected from F, Cl, Br and I. I, Br or Cl is particularly preferable, with Br being more preferable.

In the formula (A), a to e are independently a composition ratio of respective elements. a:b:c:d:e satisfies 1 to 12: above 0 to 0.2:1: above 0 to 9:0 to 9.

b is preferably 0, more preferably the ratio of a, c, d and e (a:c:d:e) is 1 to 9:1:3 to 7:0.05 to 3, further preferably a:c:d:e=2 to 6.5:1:3.5 to 5:0.1 to 1.5, with a:c:d:e=2 to 6.5:1:3.5 to 4.95:0.1 to 1.5 being most preferable.

The composition ratio of each element can be controlled by adjusting the blending amount of raw material compounds when a solid electrolyte or a solid electrolyte precursor mentioned later is produced.

As for a solid electrolyte having a crystalline structure among the solid electrolytes contained in a positive electrode mix of the invention, it is preferred that it contain the constituting components mentioned above and that it have peaks derived from crystals in the powder X-ray diffraction spectrum. The degree of crystallization of the glass ceramic solid electrolyte is preferably high, but may be low. The glass ceramic solid electrolyte may contain amorphous matters. An all-solid battery obtained by using a mix that includes a solid electrolyte containing the above-mentioned constituting components can provide an improved discharge voltage.

(2) Sulfur-Based Active Material

It is thought that, since a sulfur-based active material has a large theoretical capacity, a suitable positive electrode mix can be obtained by combining it with a sulfide-based solid electrolyte having a high ion conductivity.

The sulfur-based active material is an active material containing a sulfur element as a constituent component.

For example, a single substance of sulfur (S), and a compound comprising a sulfur element such as titanium disulfide ($TiS_2$), molybdenum sulfide ($MoS_2$), ferric sulfide (FeS, $FeS_2$), copper sulfide (CuS), nickel sulfide ($Ni_3S_2$), lithium sulfide, an organic disulfide compound, a carbon sulfide compound or the like can be used.

Examples of the organic disulfide compound and carbon sulfide compound are shown below.

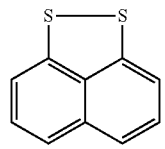

(1)

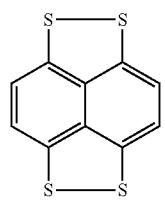

(2)

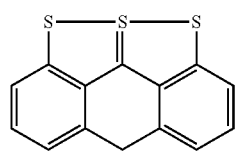

(3)

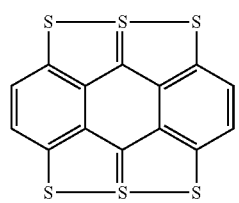

(4)

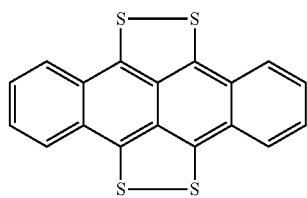

(5)

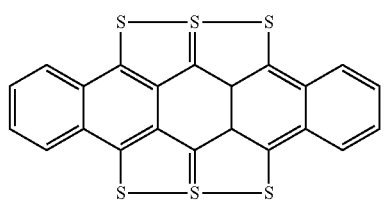

(6)

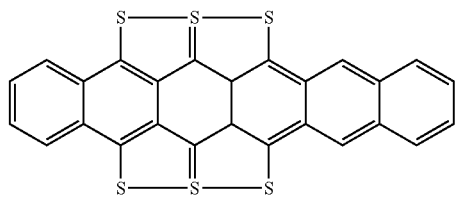

(7)

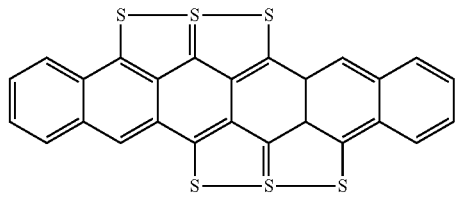

(8)

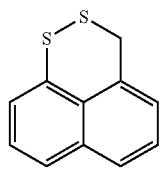

(9)

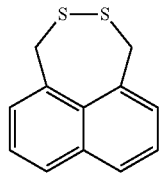

(10)

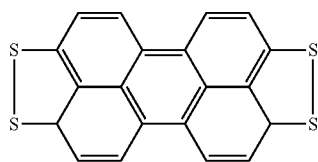

(11)

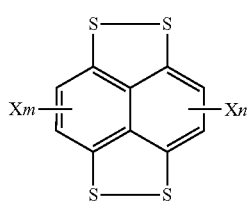

(A)

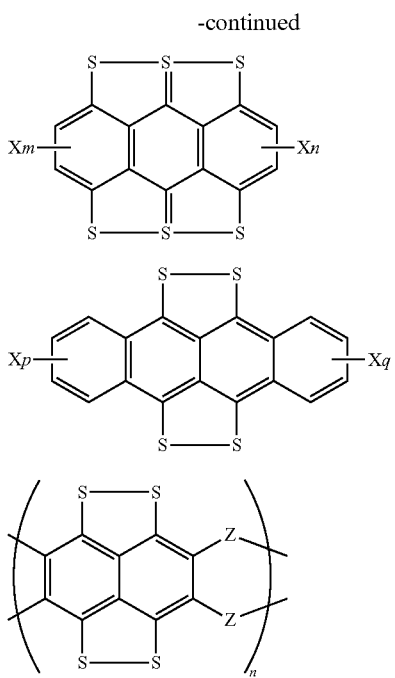

In the formulas (A) to (C), Xs are each a substituent, n and m are independently an integer of 1 to 2, and p and q are independently an integer of 1 to 4.

In the formula (D), Zs are each —S— or —NH—, and n is a repeating number and an integer of 2 to 300.

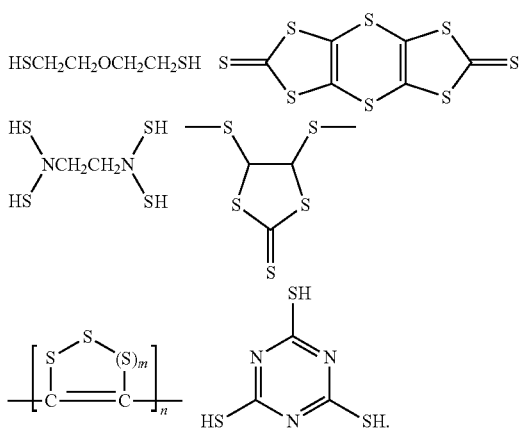

Among them, a single substance of sulfur or lithium sulfide having a high theoretical capacity is preferable.

No specific restrictions are imposed on sulfur. A single substance of sulfur having a purity of 95 wt % or more is preferable. A single substance of sulfur having a purity of 96 wt % or more is more preferable, with a single substance of sulfur having a purity of 97 wt % or more being particularly preferable.

If the purity of sulfur is 95 wt % or more, it is possible to reduce the reversible capacitance of a battery produced by using this sulfur.

As for the crystal structure of a single substance of sulfur, α-sulfur (orthorhombic crystal), β-sulfur (monoclinic crystal), γ-sulfur (monocyclic crystal), monolithic sulfur or the like can be given. They can be used alone or in combination of two or more.

As lithium sulfide, $Li_2S$, $Li_2S_2$, $Li_2S_4$, $Li_2S_8$ or the like can be given, for example. Among these, $Li_2S$ is preferable.

In the invention, incorporation of at least one of sulfur and a compound comprising a sulfur atom will suffice. There are cases; i.e. a case where only a single substance of sulfur is contained, a case where only a compound comprising a sulfur atom is contained and a case where both a single substance of sulfur and a compound comprising a sulfur atom are contained.

In these cases, two or more single substances of sulfur may be contained, or two or more compounds comprising a sulfur atom may be contained.

In the invention, it is preferred that a sulfur-based active substance be used in a mixture with a conductive material.

A conductive material is a material having an electric conductivity of $1.0 \times 10^3$ S/m or more, preferably $1.0 \times 10^4$ S/m or more, and more preferably $1.0 \times 10^5$ S/m or more.

It is preferred that the conductive material mentioned above contain fine pores. Due to the presence of fine pores, it is possible to incorporate sulfur or a sulfur-based compound in the fine pores, and as a result, not only contact area of sulfur or the like and a conductive material can be increased, the specific surface area of sulfur or the like can be increased.

The shape of the conductive material is not particularly restricted. The conductive material may be a particulate conductive material, a sheet-like conductive material or a rod-like conductive material. As the sheet-like conductive material, graphene can be given, for example. As the rod-like conductive material, carbon nanotube or the like can be given, for example. As the particulate conductive material, Ketjen black or active carbon that has a large surface area, has large fine pores and has a high electric conductivity can be given.

As the conductive material, carbon, metal powder, metal compounds or the like can be given. Among them, carbon is preferable. If the conductive material of the invention contains carbon as the conductive material, since carbon has high conductivity and is light in weight, it is possible to obtain a battery having a high energy density per mass.

Porous carbon having fine pores is more preferable as the conductive material.

As the porous carbon that is a conductive material, a carbon black such as Ketjen black, acetylene black, Denka black, thermal black, channel black, etc.; carbon such as graphite, carbon fibers, active carbon or the like can be given. They may be used alone or in combination of two or more.

It is preferred that the conductive material have fine pores and that the fine pore capacity be 0.1 cc/g or more and 5.0 cc/g or less. The fine pore volume is more preferably 0.1 cc/g or more and 4.5 cc/g or less, and particularly preferably 0.75 cc/g or more and 3.9 cc/g or less. The conductive material is preferably one having fine pores of which the average diameter is 100 nm or less. The average diameter of the fine pores is more preferably 0.1 nm or more and 100 nm or less, further preferably 0.1 nm or more and 25 nm or less, with 0.5 nm or more and 17 nm or less being most preferable.

Due to the presence of the fine pores, sulfur and/or a compound comprising a sulfur atom can be inserted into the inside of the fine pore of the conductive material. As a result, the state in which the conductive material and sulfur and/or a compound comprising sulfur (hereinafter, the "single substance of sulfur and/or a compound comprising sulfur" will be appropriately referred to as the "sulfur-based compound"), whereby electron conductivity of the electrode material can be enhanced. Further, if a conductive material is compounded with sulfur and/or a compound comprising sulfur, compounding is facilitated due to the presence of fine pores, whereby the electron conductivity of an electrode material can be improved.

If the fine pore capacity of a conductive material is less than 0.1 cc/g, the content of a sulfur-based compound within the conductive material may not be increased, resulting in difficulty in obtaining a lithium ion battery having a high electric capacity. On the other hand, if the fire pore volume of a conductive material exceeds 5.0 cc/g, even if it is compounded with a sulfur-based compound, electron conductivity may not be fully ensured.

If the average fine pore volume of a conductive material is less than 0.1 nm, it may be difficult to allow a sulfur-based compound to be impregnated in a fine pore. On the other hand, if the average fine pore diameter exceeds 100 nm, a sulfur-based compound impregnated in the fine pore may not fully function as an active material.

It is preferred that the specific surface area of a conductive material be 10 $m^2/g$ or more and 5000 $m^2/g$ or less. In order to allow a sulfur-porous carbon composite material obtained by compounding sulfur and porous carbon to secure the contact area with a solid electrolyte, for example, a larger specific surface area of porous carbon is preferable. If the specific surface area of porous carbon is too large, the average fine pore diameter becomes too small, and as a result, sulfur cannot be contained within fine pores easily. If the specific porous surface area of porous carbon is small, contact with sulfur may not be sufficient, and electron conductivity cannot be secured, whereby sulfur may not fully function as an active material. Accordingly, the BET specific surface area of porous carbon is preferably 10 $m^2/g$ or more and 5000 $m^2/g$ or less, more preferably 50 $m^2/g$ or more and 4500 $m^2/g$ or less, more preferably 70 $m^2/g$ or more and 4000 $m^2/g$ or less, and most preferably 100 $m^2/g$ or more and 3500 $m^2/g$ or less.

The BET specific surface area, the fine pore diameter, the fine pore volume and the average fine pore diameter of a conductive material can be measured by the following method. Hereinbelow, an explanation will be made by taking as an example a case where a conductive material is porous carbon. The following measuring method is not limited to a case where the conductive material is porous carbon.

The BET specific surface area, the fine pore diameter, the fine pore volume and the average fine pore diameter can be obtained by using a nitrogen adsorption isothermal curve obtained by allowing porous carbon to adsorb a nitrogen gas at a liquid nitrogen temperature.

Specifically, the specific surface area can be obtained by the Brenauer-Emmet-Telle (BET) method using a nitrogen adsorption isothermal curve. Further, the fine pore diameter and the fine pore volume can be obtained by the Barret-Joyner-Halenda (BJH) method by using a nitrogen adsorption isothermal curve (adsorption side). Further, the average fine pore diameter can be calculated from the total pore volumes and the BET surface area on the assumption that the fine pore is of a cylindrical shape.

As the measurement apparatus, a specific surface area/fine pore distribution measurement apparatus (Autosorbe-3) manufactured by Quantacrome Instruments can be used. As for the pre-treatment, vacuum discharge with heating at 200° C. for 3 hours or the like can be given.

In the invention, it is preferred that the sulfur-based active material (sulfur-based compound) and the conductive material (sulfur-based compound) be in contact with each other. In order to allow the sulfur-based active material (sulfur-based compound) to be in contact with the conductive material, it is preferred that they be integrated by a dynamic action such as a mechanical milling or the like, or it is preferred that the sulfur-based compound and the conductive material become a composite by the following method. A sulfur-based compound-conductive material composite is more preferable. The "sulfur-based compound-conductive material composite" means one obtained by depositing sulfur and/or a compound comprising a sulfur atom on the surface of the conductive material, one obtained by dissolving sulfur and/or a compound comprising a sulfur atom and allowing the resultant to be in contact with the surface of the conductive material, followed by solidification, and one obtained by synthesizing a compound comprising a sulfur atom in the presence of a conductive material to integrate the compound with the composite material. One obtained by integrating sulfur and/or a compound comprising a sulfur atom with a conductive material by a dynamic action such as mechanical milling is not included.

Meanwhile, when the surface of the conductive material has fine pores, the surface of the conductive material includes such a porous surface.

In the sulfur-based compound-conductive material composite in which a sulfur-based compound and a conductive material are compounded, the content of the sulfur-based compound is 5 to 90 wt %, for example, preferably 40 to 90 wt %, and more preferably 50 to 80 wt %.

In respect of well-balanced shaping properties and battery performance, the space ratio $\epsilon_r$ associated with elastic recovery of the sulfur-based compound-conductive material composite is preferably 0.005 to 0.15, more preferably 0.01 to 0.1, and particularly preferably 0.01 to 0.05 of the sulfur-based compound-porous carbon composite.

In the invention, the space ratio $\epsilon_r$ associated with elastic recovery is measured by an unconfined compressing apparatus that uses the cylindrical container and the pressurizing rod mentioned below, and calculated by the following formula (1):

$$\epsilon_r = 1 - \{m/(\rho_p SL)\} \quad (I)$$

wherein m is the weight of the composite to be inserted into the cylindrical container, $\rho_p$ is the true density of the composite, S is the area of the pressurizing rod, and L is the height of the composite that is obtained by compressing the composite that has been inserted into the cylindrical container such that the apparent density thereof becomes the same as the true density, followed by releasing of compression.

Cylindrical container: A cylindrical container made of SKD11 having outer diameter of 43 mm, an inner diameter of 13 mm, a height of 40 mm, a side wall thickness of 15 mm, an outer diameter and a thickness of the bottom surface of 13 mm and 10 mm, respectively.

Pressuring rod: A rod-like member made of SKD11 having an outer diameter of 13 mm and a length of 50 mm.

Figure 2:
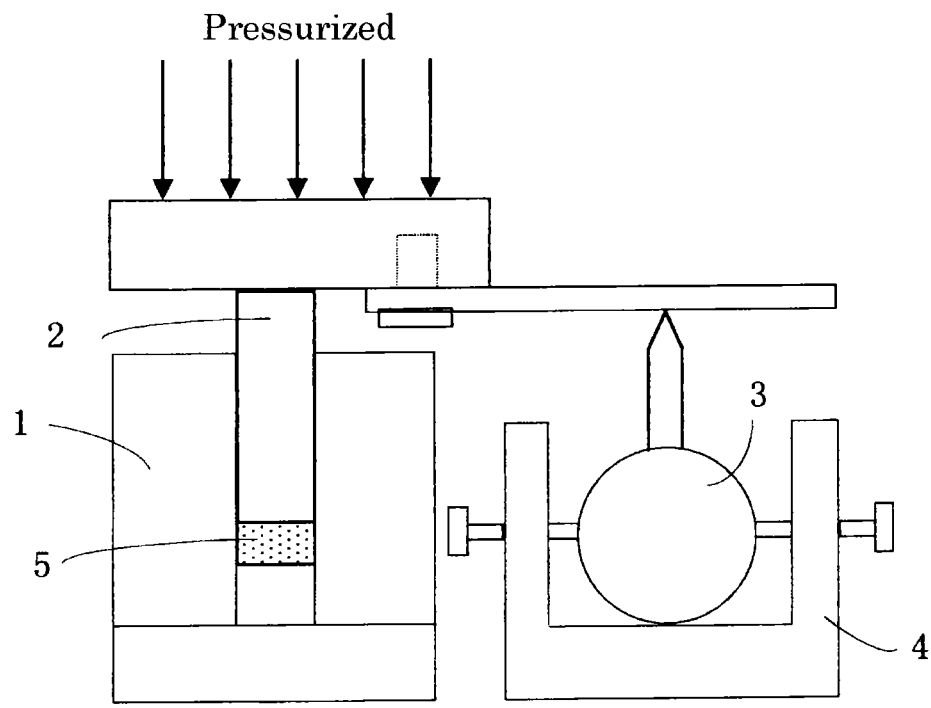
FIG. 2 is a schematic view showing a state in which a composite body is pressurized by a pressing rod.
Figure 3:
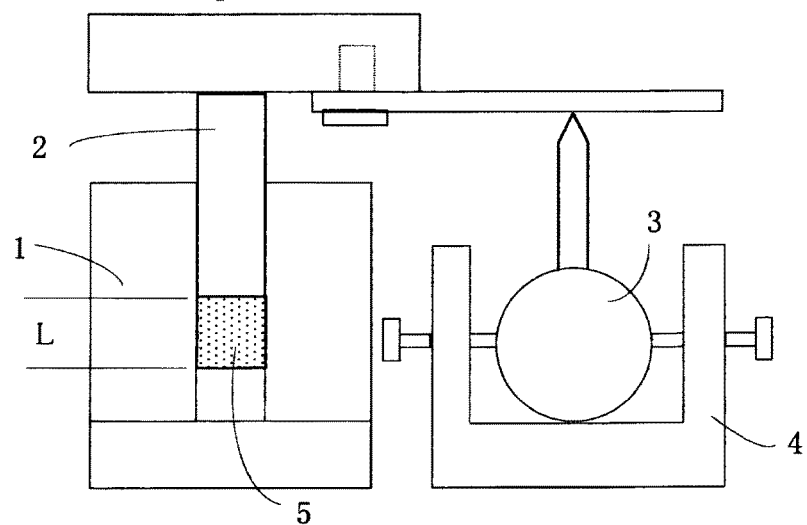
FIG. 3 is a schematic view showing a state in which the pressure by the pressurizing rod is released.

FIGS. 1 to 3 are each a schematic view for explaining the measurement of the space ratio $\epsilon_r$ associated with elastic recovery by means of an unconfined compression apparatus.

The unconfined compressing apparatus has, as primary constituent elements, a pressure-resistant cylindrical container 1, a pressurizing rod 2 for compressing the composite incorporated in the internal space of the cylindrical container 1 so that the density of the composite is increased to the true density, the measurement means (micrometer) 3 that measures the height of the composite 5 and a fixture 4 thereof.

As the cylindrical container 1, a cylindrical container made of SKD11 having an outer diameter of 43 mm, an inner diameter of 13 mm, a height of 40 mm, a side wall thickness of 15 mm, an outer diameter of a bottom surface is 13 mm and a thickness of a bottom surface is 10 mm. SKD11 is a dies steel manufactured by Daido Steel Co., Ltd.

The pressurizing rod 2 is smoothly inserted into the inside of the cylindrical container 1. It has an outer diameter of 13 mm and a length of 50 mm, and is made of SKD11. Above the pressurizing rod 2, a pressing means (not shown) for pressurization is provided. Further, a transmission part that transmits a displacement in the pressurizing rod to a micrometer is provided.

Subsequently, the measurement of the space ratio $\epsilon_r$ associated with elastic recovery by means of an unconfined compression apparatus will be specifically explained.

At first, the value ($I_0$) of the micrometer in the state where no composite is inserted is confirmed (FIG. 1).

Next, 0.3 g of the composite 5 (in the case of the composite having a large bulk density, the amount may be 0.1 g or 0.05 g) is inserted into the inside of the cylindrical container 1, and the composite is made even.

The pressurizing rod 2 is inserted into the inside of the container 1, and pressurized and compressed until the apparent density of the composite 5 becomes the same as the true density of the composite (FIG. 2). The apparent density of the composite 5 is the same as the true density means a case where the composite is compressed by the pressurizing rod 2 until the height of the composite becomes the same as that of the composite in the container 1 when the density of the composite 5 is assumed to be a true density. The side surface of the container 1 may be slightly swollen outwardly by compression by means of the pressurizing rod 2, such swell is regarded as a tolerance in measurement.

Subsequently, pressurization by means of the pressurizing rod 2 is stopped, and the force required for pressing the composite 5 by means of the pressurizing rod 2 is rendered 0 (FIG. 3). The value of the micrometer when the pressure is rendered 0 after the compression of the composite 5 is $I_3$.

From the above, L ($I_0$-$I_3$) in the above formula (I) is determined.

The true density $\rho_p$ of the composite is obtained by the following formula (II):

$$\{(\text{True density of sulfur in composite}) \times (\text{wt \% of sulfur in the composite}) + (\text{true density of porous carbon in the composite}) \times (\text{wt \% of porous carbon in the composite}\} \div 100 \quad (II)$$

The true density of the composite may also be obtained by the following formula.

$$\{(\text{True density of sulfur used when producing composite}) \times (\text{weight of sulfur used when producing composite}) + (\text{true density of porous carbon used when producing composite}) \times (\text{weight of porous carbon used when producing composite})\} \div (\text{weight of sulfur used when producing composite} + \text{weight of porous carbon used when producing composite})$$

As the method for allowing a sulfur-based active material (sulfur-based compound) to be in contact with a conductive material, in addition to a method in which a sulfur-based compound and a conductive material are mixed by means of various mills including a ball mill such as a planetary ball mill, a tumbling ball mill and a vibration ball mill; a vertical roller mill such as a ring roller mill; a high-speed rotating mill such as a hammer mill and a cage mill; and an air stream mill such as a jet mill, heating a mixture of a sulfur-based compound and a conductive material at a temperature that is equal to or higher than the melting point of a sulfur-based compound can be given.

Among these methods, mixing by means of a planetary ball mill or heating a mixture of a sulfur-based compound and a conductive material at a temperature that is equal to or higher than the melting point of a sulfur-based compound is preferable.

When a sulfur-based compound-conductive material composite is produced by heating a mixture of a sulfur-based compound and a conductive material at a temperature that is equal to or higher than the melting point of a sulfur-based compound, a heating atmosphere may be an inert gas atmosphere or air. The pressure at the time of heating is from normal pressure to 5 MPa, for example, preferably from normal pressure to 1 MPa, more preferably from normal pressure to 0.9 MPa. The normal pressure means atmospheric pressure, and means a pressure around 101325 Pa.

It suffices that the heating temperature be equal to or higher than the melting point of a sulfur-based compound. The heating temperature is preferably 112° C. to 440° C. The heat retaining time is 1 minute to 48 hours, for example, preferably 10 minutes to 12 hours, more preferably 15 minutes to 10 hours.

2. Second Aspect of a Positive Electrode Mix

The positive electrode mix according to the second aspect of the invention is a positive electrode mix which is produced by using a solid electrolyte precursor and a sulfur-based active material as a raw material, wherein the solid electrolyte precursor comprises a Li element or a Na element; a S element; and a halogen element selected from the group consisting of I, Br, Cl and F. The solid electrode precursor includes a glass solid electrolyte that comprises a Li element or a Na element; a S element; and a halogen element selected from the group consisting of I, Br, Cl and F, or a glass ceramic solid electrolyte that comprises a Li element or a Na element; a S element; and a halogen element selected from the group consisting of I, Br, Cl and F. The glass solid electrolyte means an amorphous glass solid electrolyte and the glass ceramic solid electrolyte means a solid electrolyte that comprises crystal components.

Here, it is preferred that the solid electrolyte contain a Li element or a Na element; a S element; a P element; and a halogen element selected from the group consisting of I, Br, Cl and F.

The positive electrode mix is preferably a positive electrode mix that is obtained by mixing a solid electrolyte precursor comprising each of a Li element, a S element and a P element, and a halogen element selected from the group consisting of I, Br, Cl and F, followed by a heat-treatment.

A description will be made later on the solid electrolyte precursor. The sulfur-based active material is the same as the first aspect mentioned above.

3. Production of a Positive Electrode Mix

The positive electrode mix of the invention can be produced by a method in which a solid electrolyte having the composition represented by the formula (A) mentioned above or a solid electrolyte precursor that becomes the above-mentioned solid electrolyte by heating or the like (a glass solid electrolyte, a mixture of a glass solid electrolyte and a glass ceramic solid electrolyte, a mixture of glass and glass ceramic, or a mixture of these and the raw material compounds) and the above-mentioned sulfur-based active material are integrated by a dynamic action such as mechanical milling, followed by heating.

As for the solid electrolyte precursor, if it is a precursor that comprises a halogen element (F, Cl, Br, I) and is a glass solid electrolyte, or if it is a glass ceramic solid electrolyte, it is preferred that a solid electrolyte obtained by subjecting the precursor to a heat treatment (hereinafter appropriately referred as a "heat-treated solid electrolyte") or the glass ceramic electrolyte have, in powder X-ray diffraction (CuKα:λ=1.5418 Å), diffraction peaks at least at 2θ16.3±0.3 deg, 21.3±0.3 deg, and 33.1±0.5 deg.

More specifically, if the halogen element of the solid electrolyte precursor is Br and the solid electrolyte is a glass solid electrolyte, a solid electrolyte obtained by subjecting the precursor to a heat treatment (hereinafter appropriately referred as a "heat-treated solid electrolyte") or if the solid electrolyte precursor is a glass ceramic solid electrolyte, the glass ceramic solid electrolyte have, in powder X-ray diffraction (CuKα:λ=1.5418 Å), diffraction peaks at least at 2θ=15.6±0.3 deg, 16.3±0.3 deg, 21.3±0.3 deg, 29.8±0.3 deg, 31.5±0.3 deg, and 33.1±0.3 deg.

If the halogen element of the solid electrolyte precursor is Cl and the solid electrolyte is a glass solid electrolyte, a solid electrolyte obtained by subjecting the precursor to a heat treatment (hereinafter appropriately referred as a "heat-treated solid electrolyte") have, or if the solid electrolyte precursor is a glass ceramic precursor solid electrolyte, the glass ceramic solid electrolyte have a powder X-ray diffraction pattern (CuKα:λ=1.5418 Å) at least at 2θ=15.6±0.3 deg, 16.3±0.3 deg, 21.3±0.3 deg, 29.8±0.3 deg, 31.5±0.3 deg, and 33.1±0.3 deg.

If the solid electrolyte is a glass solid electrolyte or if the solid electrolyte precursor is a glass ceramic solid electrolyte, it is preferred that a solid electrolyte obtained by subjecting the precursor to a heat treatment (hereinafter appropriately referred to as the "heat-treated solid electrolyte") or the glass ceramic solid electrolyte have a $^{31}$P-NMR spectrum that has a first peak in the first peak region (75.0 ppm or more and 80.0 ppm or less) and have a peak intensity ratio of a peak in other regions than the first peak region and the second peak region (86.0 ppm or more and 92.0 ppm or less) relative to the first peak of 0.5 or less.

It is preferred that the $^{31}$P-NMR spectrum of the heat-treated solid electrolyte or the glass ceramic solid electrolyte have a peak in the first peak region and the second peak region.

Further, it is preferred that the peak intensity ($I_2/I_1$) of the second peak ($I_2$) in the second peak region relative to the first peak ($I_1$) be 1 or more and 10 or less.

The first peak and the second peak may be shoulder peaks. The shoulder peak means a smaller peak that appears as part of a larger peak, when two or more peaks differing in size are overlapped. If the position of a peak top cannot be understood due to the absence of a clear maximal point, the peak position of the shoulder peak is a position where the absolute value of a differential value in each peak region becomes the smallest.

The heat treatment temperature of the precursor mentioned above may be equal to or higher than the crystallization temperature of glass contained in the precursor. For example, the heat treatment temperature is 180° C. or more and 330° C. or less, and a temperature at which the glass is crystallized.

In the invention, the diffraction pattern of the powder X-ray diffraction (CuKα:λ=1.5418 Å) mentioned above is obtained by applying X-ray beam (CuKα:λ=1.5418 Å) to an object to be measured. The diffraction pattern is obtained as follows: A solid electrolyte sample to be measured is molded into a shape having a cross sectional diameter (φ) of 10 mm and a thickness of 0.1 to 1 mm. This sample specimen is attached to a sample jig for anaerobic measurement. The sample specimen in the fixture is placed in a Smart lab apparatus (manufactured by Rigaku Corporation), and then exposed to X-ray beam (CuKα:λ=1.5418 Å).

Raw materials may remain in the heat-treated solid electrolyte. For example, LiCl may remain.

In the invention, measurement of the $^{31}$P-NMR spectrum is conducted at room temperature by using an NMR apparatus (JNM-CMXP302 manufactured by JEOL Ltd. that was provided with a 5 mmCP/MAS probe). The $^{31}$P-NMR spectrum is measured by the single pulse method with a 90° pulse of 4 μs and a rotation of a magic angle of 8.6 kHz. The chemical shift is measured by using ammonium hydrogen phosphate as an external standard (1.3 ppm). The measurement range is 0 ppm to 150 ppm.

The peak intensity is the height from the baseline to the peak top.

The average value of a hydrogen sulfide concentration of the heated solid electrolyte obtained by subjecting a solid electrolyte precursor to a heat treatment and the solid electrolyte precursor by a hydrolysis test is preferably 200 ppm by weight or less. More specifically, the average value of a hydrogen sulfide concentration of a surrounding environment when they are allowed to stand for 60 minutes in circulation of wet air is preferably 200 ppm by weight or less. More preferably 150 ppm by weight or less, further preferably 100 ppm by weight or less.

In general, a sulfide-based solid electrolyte generates hydrogen sulfide when being hydrolyzed. In the solid electrolyte mentioned above, since hydrolysis can be suppressed, the amount of hydrogen sulfide generated at the time of decomposition is decreased. Therefore, it is highly safe.

In the invention, a hydrolysis test is conducted by the following technique, and the obtained average value of a hydrogen sulfide concentration is used as an index of hydrolysis resistance.

Figure 4:
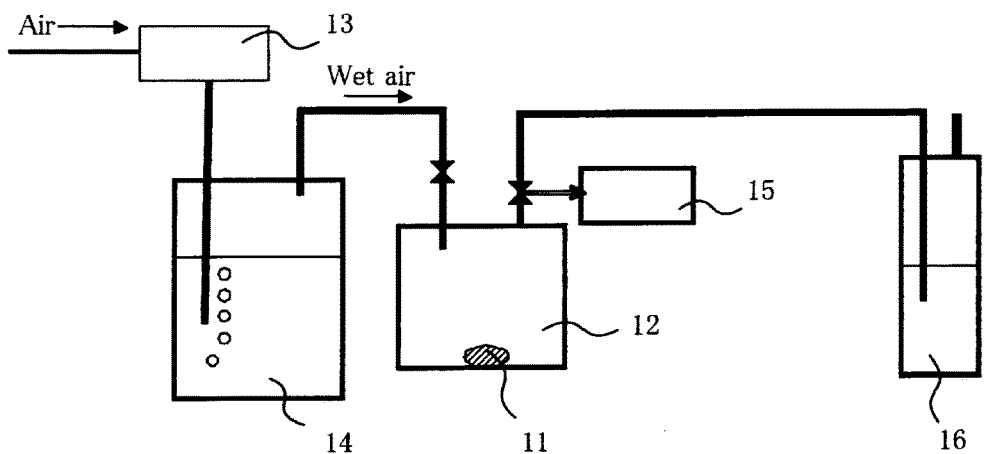
FIG. 4 is a schematic configuration view showing an apparatus for measuring an average of a hydrogen sulfide concentration.

FIG. 4 is a view showing a schematic configuration of an apparatus for measuring the average value of a hydrogen sulfide concentration.

As the measurement sample 11, one which is thoroughly pulverized in a mortar in a nitrogen glove box in an environment where the dew point is −80° C. is used. 0.1 g of the measurement sample 11 is enclosed in a 100-ml Schlenk bottle 12.

Then, air that has been humidified (wet air) by passing through a water tank 14 is distributed in the Schlenk bottle 12 at a rate of 500 ml/min. The temperature of the wet air is about 25° C. and the humidity is about 80 to 90%. The flow rate of the air is controlled by a flow meter 13.

A gas discharged from the Schlenk bottle 12 during the period of time after 1 minute to 1 minute and 45 seconds from the start of the circulation is collected at a gas-collecting part 15, whereby a first sample gas for the measurement is obtained. As for the gas discharged at the time other than the gas collection time, the hydrogen sulfide is removed with an aqueous sodium hydroxide solution by a trap 16.

By using TS-100 (manufactured by Mitsubishi Chemical Analytech Co., Ltd.), the sulfur content is quantified by the UV fluorescence method, thereby to calculate the concentration of hydrogen sulfide in the sample gas. When the sample gas was subjected to a qualitative analysis by gas chromatography using the Agilent 6890 (provided with a sulfur selective detector (SIEVERS355)), it has been confirmed that 99% or more of the sulfur has been converted to a hydrogen sulfide gas.

As for the gas discharged from the Schlenk bottle 12 after the lapse of 5 minutes to 5 minutes and 45 seconds, after 10 minutes to 10 minutes and 45 seconds, after 20 minutes to 20 minutes and 45 seconds, after 60 minutes to 60 minutes and 45 seconds after the start of the circulation, the measurement is performed in the same manner as in the first sample gas.

The average of a hydrogen sulfide concentration (ppm) is obtained from the measurement time and the hydrogen sulfide concentration.

Figure 5:
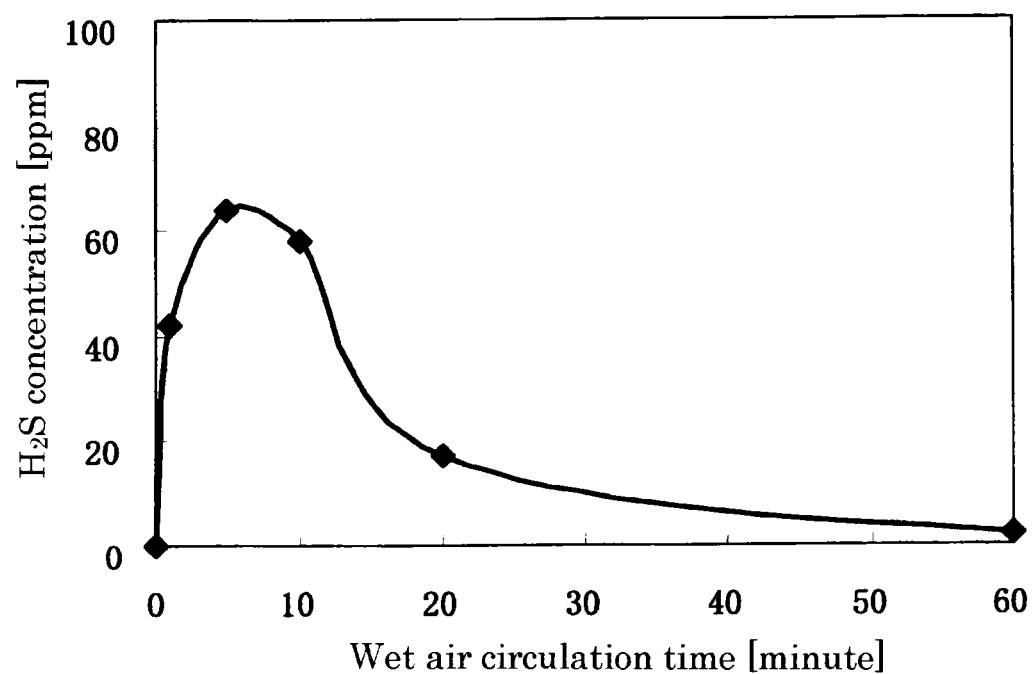
FIG. 5 is a view showing one example of the relation between a circulation time of wet air and a hydrogen sulfide concentration.

An example of the relationship between the wet air passage time and the hydrogen sulfide concentration is shown in FIG. 5. The curve is obtained by smoothing each measurement point. By dividing an area surrounded by this curve, the vertical axis and the horizontal axis (ppm/min) by the time (60 minutes), the average value of the hydrogen sulfide concentration (ppm) is obtained.

It is preferred that the ion conductivity of the heated solid electrolyte obtained by subjecting a solid electrolyte precursor singly to a heat treatment be $3 \times 10^{-4}$ S/cm or more, more preferably $5 \times 10^{-4}$ S/cm or more. The ion conductivity is further preferably $7 \times 10^{-4}$ S/cm or more, with $9 \times 10^{-4}$ S/cm or more being most preferable.

A higher ion conductivity is preferable. For example, as the upper limit of the ion conductivity, $5 \times 10^{-2}$ S/cm can be mentioned.

As the above-mentioned solid electrolyte precursor, the following electrolyte precursors 1 to 3 can be mentioned, for example.

(1) Electrolyte Precursor 1

The electrolyte precursor 1 is a glass solid electrolyte or a ceramic solid electrolyte and is a compound represented by the following formula (D)

$$L_a M_b P_c S_d X_e \qquad (D)$$

In the formula (D), L, M, X, a, b, c, d and e are as defined in the formula (A).

The electrolyte precursor 1 is produced by reacting the following raw material a and a compound containing a halogen element by a prescribed method.

(a) Raw Materials a

As the raw material a, $Li_2S$ (lithium sulfide), $P_2S_3$ (phosphorus trisulfide), $P_2S_5$ (phosphorus pentasulfide), $SiS_2$ (silicon sulfide), $Li_4SiO_4$ (lithium orthosilicate), $Al_2S_3$ (aluminum sulfide), a single substance phosphorus (P), a single substance sulfur (S), silicon (Si), $GeS_2$ (germanium sulfide), $B_2S_3$ (arsenic trisulfide), $Li_3PO_4$ (lithium phosphate), $Li_4GeO_4$ (lithium germanate), $LiBO_2$ (lithium metaborate), $LiAlO_3$ (lithium aluminate), $Na_2S$ (sodium sulfide), $Na_4GeO_4$ (sodium germanate), $Na_4SiO_4$ (sodium orthosilicate), $Na_3PO_4$ (sodium phosphate), $NaBO_2$ (sodium metaborate), $NaAlO_3$ (sodium aluminate), and the like can be used. These compounds may be used in a mixture of two or more.

As the preferable raw material a, phosphor sulfide such as $Li_2S$ and $P_2S_5$, a single substance of sulfur and a single substance of phosphorous, phosphor sulfide and a single substance of sulfur, phosphor sulfide, a single substance of sulfur and a single substance of phosphorous or the like can be given.

No specific restrictions are imposed on lithium sulfide. Commercially available product can be used. However, one having a high degree of purity is preferable. Lithium sulfide can be produced by a method stated in JP-A-H07-330312, JP-A-H09-283156, JP-A-2010-163356 and the Japanese Patent Application No. 2009-238952, for example.

Specifically, lithium sulfide can be synthesized by a method in which lithium hydroxide and hydrogen sulfide are allowed to react at 70° C. to 300° C. in a hydrocarbon-based organic solvent to generate lithium hydrogen sulfide, and the reaction liquid is then hydrodesulfurized (JP-A-2010-163356).

Further, lithium sulfide can be synthesized by a method in which lithium hydroxide and hydrogen sulfide is allowed to react at 10° C. to 100° C. in an aqueous solvent to generate lithium hydrogen sulfide, and the reaction liquid is then hydrodesulfurized (Japanese Patent Application No. 2009-238952).

As for the lithium sulfide, the total content of a lithium salt of a sulfur oxide is preferably 0.15 mass % or less, more preferably 0.1 mass % or less, and that the content of lithium N-methylaminobutyrate is preferably 0.15 mass % or less, more preferably 0.1 mass % or less. If the total content of a lithium salt of a sulfur oxide is 0.15 mass % or less, a solid electrolyte obtained by melt quenching or mechanical milling becomes a glassy electrolyte (complete amorphous). On the other hand, if the total content of a lithium salt of a sulfur oxide exceeds 0.15 mass %, the resulting electrolyte may be a crystallized product from the beginning.

If the content of lithium N-methylaminobutyrate is 0.15 mass % or less, there is no fear that a deteriorated product of lithium N-methylaminobutyrate lowers the cycle property of a lithium ion battery. By using lithium sulfide of which the amount of impurities has been decreased in this way, a highly ionic conductive electrolyte can be obtained.

If lithium sulfide is produced based on JP-A-H07-330312 and JP-H09-283156, since lithium sulfide contains a lithium salt of a sulfur oxide or the like, it is preferable to conduct purification.

On the other hand, lithium sulfide that is produced by a method described in JP-A-2010-163356 may be used without purification, since the content of a lithium salt of a sulfur oxide or the like is significantly small.

As preferable purification methods, a purification method described in WO2005/40039 or the like can be given. Specifically, lithium sulfide obtained as above is washed in an organic solvent at a temperature of 100° C. or higher.

No specific restrictions are imposed on phosphorous pentasulfide ($P_2S_5$) as long as it is produced and sold on the industrials basis, for example.

(b) Compound Comprising a Halogen Element

As the compound comprising a halogen element, a compound represented by the following formula (E) can be used. One compound may be used or a plurality of compounds may be used.

$$M_w\text{-}X_x \qquad (E)$$

In the formula (E), M is an alkali metal such as Li, Na and K; B, Al, Si, P, S, Ge, As, Se, Sn, Sb, Te, Pb or Bi. P or Li is particularly preferable. w is an arbitral integer of 1 to 2, and x is an arbitral integer of 1 to 10.

X is the same as X in the formula (C).

As compounds comprising a halogen element, specific examples include LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $POCl_3$, $PBr_3$, $POBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl and NaBr, with LiCl, LiBr, LiI, $PCl_5$, $PCl_3$, $PBr_5$ and $PBr_3$ being preferable. LiCl, LiBr, LiI and $PBr_3$ are more preferable.

In addition to a compound comprising the above-mentioned raw material a or the compound that contains a halogen element, a compound that lowers the glass transition temperature (vitrification accelerating agent) may be added. Examples of the vitrification accelerating agent include inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$ and $Na_3InO_3$.

(c) Method for Producing Electrolyte Precursor 1

Hereinbelow, an explanation will be made on the method for producing an electrolyte precursor 1 using lithium sulfide and phosphorus pentasulfide as the raw material a.

The amount ratio of lithium sulfide and phosphorous pentasulfide (molar ratio) is 60:40 to 90:10, preferably 65:35 to 85:15 or 70:30 to 90:10, further preferably 67:33 to 83:17 or 72:28 to 88:12, and particularly preferably 67:33 to 80:20 or 74:26 to 86:14. The amount ratio is particularly further preferably 70:30 to 80:20 or 75:25 to 85:15. Most preferably, the amount ratio of lithium sulfide and phosphorous pentasulfide (molar ratio) is 72:28 to 78:22 or 77:23 to 83:17.

The ratio (molar ratio) of the total of moles of lithium sulfide and moles of phosphorous pentasulfide to the compound comprising a halogen element is preferably 50:50 to 99:1, more preferably 55:45 to 97:3 or 70:30 to 98:2, with 60:40 to 96:4 or 80:10 to 98:2 being further preferable. A ratio of 70:30 to 96:4 or 80:20 to 98:2 is particularly preferable. It is preferred that the total of moles of lithium sulfide and moles of phosphorous lithium sulfide and the compound comprising a halogen element be subjected to a heat treatment after mixing by a mechanical milling treatment, or the like.

A material obtained by mixing lithium sulfide, phosphorous pentasulfide and a compound comprising a halogen element with the above-mentioned amount ratio is treated by a melt quenching method, a mechanical milling method (hereinafter, the "mechanical milling" will be abbreviated as "MM"), a slurry method in which raw materials are reacted in an organic solvent or a solid-phase method or the like, whereby an electrolyte precursor 1 (glass solid electrolyte) is produced.

(a) Melt Quenching Method

The melt quenching method is stated in JP-A-H06-279049 and WO2005/119706 or the like.

Specifically, prescribed amounts of $P_2S_5$, $Li_2S$ and a compound comprising a halogen are mixed in a mortar to obtain a pellet-like mixture, and the mixture is then put in a carbon-coated quarts tube and vacuum sealed. After reacting at a specific reaction temperature, the tube is put in ice and quenched, whereby an electrolyte precursor 1 (glass solid electrolyte) can be obtained.

The reaction temperature is preferably 400 to 1000° C., more preferably 800 to 900° C.

The reaction time is preferably 0.1 to 12 hours, more preferably 1 to 12 hours.

The quenching temperature of the above reaction product is normally 10° C. or less, preferably 0° C. or less. The cooling rate thereof is normally about 1 to 10000 K/sec, preferably 10 to 10000 K/sec.

(b) Mechanical Milling Method (MM Method)

The MM method is stated in JP-A-H11-134937, JP-A-2004-348972 and JP-A-2004-348973, for example. Specifically, prescribed amounts of $P_2S_5$, $Li_2S$ and a compound comprising a halogen element are mixed in a mortar, and the resulting mixture is allowed to react for a prescribed period of time by using various ball mills or the like, whereby an electrolyte precursor 1 is obtained.

In the MM method using the above-mentioned raw materials, the reaction can be conducted at room temperature. Therefore, there is an advantage that thermal decomposition of the raw materials hardly occurs, whereby an electrolyte precursor 1 (glass solid electrolyte) having the composition at the time of preparation can be obtained.

The MM method has an advantage that the solid electrolyte precursor 1 (glass solid electrolyte) can be finely pulverized simultaneously with the production thereof.

In the MM method, various methods such as a rotation ball mill, a tumbling ball mill, a vibration roll mill and a planetary ball mill or the like can be used.

As for the conditions for the MM method, if a planetary ball mill is used, for example, the treatment may be conducted at a rotation speed of several tens to several hundred rotations per minute for a treatment time of 0.5 hours to 100 hours.

As described in JP-A-2010-90003, as for the ball for the ball mill, balls differing in diameter may be used in combination.

Further, as described in JP-A-2009-110920 or in JP-A-2009-211950, an organic solvent is added to the raw material to allow it to be a slurry, and the slurry is subjected to a MM treatment.

As described in JP-A-2010-30889, the temperature inside the mill at the time of the MM treatment may be adjusted.

It is preferred that the raw treatment temperature at the time of the MM treatment be 60° C. or higher and 160° C. or lower.

(c) Slurry Method

The slurry method is stated in WO2004/093099 and WO2009/047977.

Specifically, by reacting prescribed amounts of $P_2S_5$ particles, $Li_2S$ particles and a halogen in an organic solvent for a prescribed period of time, an electrolyte precursor 1 (glass solid electrolyte) can be obtained.

It is preferred that a compound comprising a halogen be dissolved in an organic solvent, or be particles.

As described in JP-A-2010-140893, in order to promote the reaction, the reaction may be conducted while circulating the slurry containing the raw material between the beads mill and a reaction apparatus.

Further, as described in WO2009/047977, a reaction can be proceeded efficiently by pulverizing in advance lithium sulfate as the raw material.

In addition, as described in JP-A-2011-136899 in order to increase the specific surface area, lithium sulfide as the raw material may be immersed in a polar solvent (for example, methanol, diethyl carbonate, acetonitrile) having a dissolution parameter of 9.0 or more for a prescribed period of time.

The reaction temperature is preferably 20° C. or higher and 80° C. or lower, with 20° C. or higher and 60° C. or lower being more preferable.

The reaction time is preferably 1 hour or more and 16 hours or less, more preferably 2 hours or more and 14 hours or less.

The amount of an organic solvent may be an amount such that, lithium sulfide, lithium pentasulfide and a compound comprising a halogen as raw materials become in the state of a solution or a slurry by addition of an organic solvent. Normally, the amount of the raw materials (total amount) relative to 1 liter of the organic solvent is about 0.001 kg or more and 1 kg or less. The amount of the raw material is preferably 0.005 kg or more and 0.5 kg or less, with 0.01 kg or more and 0.3 kg or less being particularly preferable.

Although no particular restrictions are imposed on the organic solvent, a non-protonic organic solvent is particularly preferable.

As the non-protonic organic solvent, a non-protonic nonpolar organic solvent (for example, carbon hydroxide-based organic solvent), a non-protonic polar organic solvent (an amide compound, a lactam compound, a urea compound, an organic sulfur compound, a cyclic organic phosphor compound or the like, for example) can preferably be used as a single solvent or a mixed solvent.

The hydrocarbon-based organic solvent, a saturated hydrocarbon, an unsaturated hydrocarbon or an aromatic hydrocarbon can be used.

Examples of the saturated hydrocarbon include hexane, pentane, 2-ethylhexane, heptane, decane and cyclohexane.

As the unsaturated hydrocarbons, hexene, heptene, cyclohexene or the like can be given.

As the aromatic hydrocarbon, toluene, xylene, decalin, 1,2,3,4-tetrahydronaphthalene and the like can be given.

Among these, toluene and xylene are particularly preferable.

It is preferred that the hydrocarbon-based solvent be dehydrated in advance. Specifically, as the water content, 100 ppm by weight or less is preferable, with 30 wt. ppm or less being particularly preferable.

According to need, other solvents may be added to the hydrocarbon-based solvent. Specific examples thereof include ketones such as acetone and methyl ethyl ketone, ethers such as tetrahydrofuran, alcohols such as ethanol and butanol, esters such as ethyl acetate and halogenated hydrocarbons such as dichloromethane and chlorobenzene.

(d) Solid Phase Method

The solid phase method is stated in "H-J, Deiseroth, et. al., Angew. Chem. Int. Ed. 2008, 47, 755-758", for examples. Specifically, specific amounts of $P_2S_5$, $Li_2S$ and a compound comprising a halogen are mixed in a mortar, followed by heating at 100 to 900° C., whereby an electrolyte precursor 1 (glass solid electrolyte) is obtained.

The production conditions such as the temperature conditions, the treatment time, and the charged amount or the like of the melt quenching method, the MM method, the slurry method and the solid phase method can be appropriately adjusted according to equipment or the like.

As the method for producing an electrolyte precursor 1 (glass solid electrolyte), the MM method, the slurry method or the solid phase method is preferable. Due to capability of production at a low cost, the MM method and the slurry method are more preferable, with the slurry method being particularly preferable.

In any of the melt quenching method, the MM method, the slurry method and the solid phase method, the order of mixing may be such that the composition of the final precursor is in the above-mentioned range. For example, if it is the mechanical milling method, milling may be conducted after mixing all of $Li_2S$, $P_2S_5$ and LiBr; milling may be conducted after milling $Li_2S$ and $P_2S_5$, following by further milling after addition of LiBr; milling may be conducted after mixing LiBr and $P_2S_5$, following by further milling after addition of $Li_2S$; or milling may be conducted after milling $Li_2S$ and LiBr, followed by further milling after addition of $P_2S_5$. Alternatively, milling may be conducted in such a manner that a mixture obtained by mixing and milling $Li_2S$ and LiBr and a mixture obtained by mixing and milling LiBr and $P_2S_5$ are mixed, followed by further milling.

In addition to the methods mentioned above, when mixing is conducted twice or more, two or more different methods may be used in combination. For example, a treatment may be conducted in such a manner that, after subjecting $Li_2S$ and $P_2S_5$ to a mechanical milling, LiBr is mixed, and the treatment is conducted by the solid phase method. Alternatively, a product obtained by treating $Li_2S$ and LiBr by the solid phase method and a product obtained by treating $P_2S_5$ and LiBr by the melt quenching method are mixed, and the resulting mixture is treated by the slurry method, whereby an electrolyte precursor is produced.

By the above, the electrolyte precursor 1 is obtained as a glass solid electrolyte. One obtained by subjecting the precursor to a heat treatment or the like to be glass ceramic may be used as an electrolyte precursor. Further, as the solid electrolyte, by mixing with a sulfur-based active material or the like, the positive electrode mix of the invention can be produced. The heating conditions for allowing the precursor to be glass ceramic are the same as the heating conditions after the solid electrolyte precursor and the sulfur-based active material to be integrated by dynamic actions.

If the electrolyte precursor 1 is a glass solid electrolyte, it is preferred that two temperature peaks (crystallization peaks) be observed in differential scanning calorimetry or the like be observed, it is more preferred that the two crystallization peaks be observed in the range of 150° C. or higher and 360° C. or lower. It is preferred that the distance between the two crystallization peaks be 20 to 150° C., preferably 20 to 100° C.

The crystallization temperature (peak) can be specified by means of a differential thermal thermogravimetric apparatus (TGA/DSC1, manufactured by Mettler Toledo International Inc.) and by measuring about 20 mg of the solid electrolyte (glass) at a rate of 10° C./min.

It is preferred that the solid electrolyte have two crystallization peaks and these two crystallization peaks be in a range of 170° C. or higher and 330° C. or lower, and that the distance between the two crystallization peaks be 20 to 150° C.

It is further preferred that the two crystallization peaks be in a range of 170° C. or higher and 330° C. or lower, and that the distance between the two crystallization peaks be 30 to 140° C.

Further, it is particularly preferred that the solid electrolyte have two crystallization peaks and these two crystallization peaks be in a range of 175° C. or higher and 320° C. or lower, and that the distance between the two crystallization peaks be 30 to 140° C.

It is particularly preferred that the two crystallization peaks be in a range of 175° C. or higher and 320° C. or lower, and that the distance between the two crystallization peaks be 35 to 130° C. It is most preferred that the solid electrolyte have two crystallization peaks and that the two crystallization peaks be in a range of 180° C. or higher and 310° C. or lower, and that the distance between the two crystallization peaks be 40 to 120° C.

(2) Electrolyte Precursor 2

An electrolyte precursor 2 (glass solid electrolyte) is obtained by further adding a halogen compound to the above-mentioned electrolyte precursor 1 (glass solid electrolyte).

It is preferred that the electrolyte precursor 1 and a halogen compound be mixed by a MM treatment or the like. As the halogen compound, the same compound as the compound containing a halogen atom in the above-mentioned first production method can be used.

In the electrolyte precursor 2 (glass solid electrolyte), the total of the amount of a halogen element-containing compound used as the raw material of the electrolyte precursor 1 (glass solid electrolyte) and the amount of the halogen compound to be mixed with the electrolyte precursor 1 (glass solid electrolyte) be the same as the halogen element-containing compound used as the raw material for the electrolyte precursor 1 (glass solid electrolyte) in the first production method. The amount ratio of the compound containing a halogen element that is the raw material of the electrolyte precursor 1 (glass solid electrolyte) and the halogen compound to be mixed with the electrolyte precursor 1 (glass solid electrolyte) is not particularly restricted.

From the above, the electrolyte precursor 2 is obtained as a glass solid electrolyte. One that is obtained by subjecting the precursor to a heat treatment or the like to allow it to be glass ceramic may be used as an electrolyte precursor.

(3) Electrolyte Precursor 3

The electrolyte precursor 3 is obtained by adding a halogen compound to a solid electrolyte satisfying the composition represented by the following formula (F). This solid electrolyte may be glass or glass ceramics.

$L_aM_bP_cS_d$ (F)

(in the formula (F), L, M, a, b, c and d are the same as in the formula (A))

The solid electrolyte satisfying the formula (F) of the electrolyte precursor 3 differs from the electrolyte precursor 1 in that the compound containing a halogen element is not added to the raw material of the electrolyte precursor 1.

That is, the electrolyte precursor 3 is a mixture of a solid electrolyte that satisfies the formula (F) and is produced by using only raw material a and the compound that contains a halogen element. Therefore, the raw material a, the compound that contains a halogen element and the production conditions of the electrolyte precursor, as well as the production conditions of the solid electrolyte are the same as those in the first production method, and hence, an explanation is omitted.

When lithium sulfide and phosphorous pentasulfide are used as the raw material a of the solid electrolyte that satisfies the formula (F), the amount ratio of lithium sulfide and phosphorous pentasulfide (molar ratio) is 60:40 to 90:10, preferably 65:35 to 85:15 or 70:30 to 90:10, further preferably 67:33 to 83:17 or 72:28 to 88:12, and particularly preferably 67:33 to 80:20 or 74:26 to 86:14. The amount ratio is particularly further preferably 70:30 to 80:20 or 75:25 to 85:15. Most preferably, the amount ratio of lithium sulfide and phosphorous pentasulfide (molar ratio) is 72:28 to 78:22 or 77:23 to 83:17.

The ratio (molar ratio) of the solid electrolyte that satisfies the formula (F) and the compound that contains a halogen element is preferably 50:50 to 99:1, more preferably 55:45 to 97:3 or 70:30 to 98:2, with 60:40 to 96:4 or 80:10 to 98:2 being further preferable. A ratio of 70:30 to 96:4 or 80:20 to 98:2 is particularly preferable.

It is preferred that the compound comprising the solid electrolyte that satisfies the formula (F) and an element be subjected to a heat treatment after mixing by a MM treatment.

The solid electrolyte or the solid electrolyte precursor mentioned above and a sulfur-based active material are heated after integrating the solid electrode or the solid electrolyte precursor mentioned above with a sulfur-based active material by a dynamic action such as a mechanical milling treatment. Specifically, after treating such as mixing with a kneader, a ball mill such as a planetary ball mill, a tumbling roll mill and a vibration roll mill, a vertical roller mill such as a ring roller mill, a high-speed rotation mill such as a hammer mill and a cage mill, and an air stream mill such as a jet mill, or by wet blending by means of a fill mix, dry blending by means of mechano-fusion, or the like, heating is conducted.

The mixing ratio of the sulfur-based active material and the solid electrolyte or the solid electrolyte precursor is not particularly restricted. However, if the amount of the active material is too large, the ion conductive path is hardly formed within the mix, causing lowering in voltage or lowering in utilization ratio of the active material. On the other hand, if the amount of the active material is small, the electric capacitance is reduced. Therefore, the weight ratio (sulfur-based active material:solid electrolyte) is preferably 20:80 to 90:10, more preferably 30:70 to 80:20, further preferably 40:60 to 75:25, and most preferably 50:50 to 70:30.

In the positive electrode mix of the invention, in addition to the sulfur-based active material, the solid electrolyte or the solid electrolyte precursor, a binder resin, a conductive material (conductive aid) and other positive electrode active materials or the like may be added.

As the binder, a fluorine-containing resin such as polytetrafluoroethylene (PTFE), polyvinylidene fluoride (PVdF), and fluorine rubber, a thermoplastic resin such as polypropylene and polyethylene, an ethylene-propylene-diene monomer (EPDM), sulfonated EPDM, natural butyl rubber (NBR) or the like can be used singly or in a mixture of two or more. In addition, a cellulose-based binder as a water-based binder, a water dispersion of styrene-butadiene rubber (SBR) or the like can also be used.

As the conductive aid, the conductive material mentioned above can be used.

As for the heating temperature after integrating by a dynamic action, it is preferred that the heating temperature be equal to or higher than the glass transition temperature (Tg) and (Tc+100° C.) or less if the solid electrolyte precursor contains glass (Tg: glass transition temperature, Tc: crystallization temperature). If the heating temperature is less than the Tg, crystallization may take a significantly long time. On the other hand, if the heating temperature exceeds (Tc+100° C.), the solid electrolyte may be deteriorated, resulting in a lowered ion conductivity. The heating temperature is more preferably (Tg+5° C.) or more and (Tc+90° C.) or less, further preferably (Tg+10° C.) or more and (Tc+80° C.) or less.

For example, the heating temperature is 150° C. or higher and 360° C. or lower, preferably 160° C. or higher and 350° C. or lower, more preferably 180° C. or higher and 310° C. or lower, further preferably 180° C. or higher and 290° C. or lower, and particularly preferably 190° C. or higher and 270° C. or lower.

If two peaks appear in the measurement of thermal properties, the peak temperature at the low temperature side is taken as Tc, and the heat treatment is preferably conducted at a temperature between the Tc at the low temperature side and the secondary crystallization peak (Tc2) at the high temperature side.

As mentioned above, the crystallization temperature (peak) can be specified by differential scanning calorimetry.

Since the crystallization temperature or the like may vary depending on the heating rate or the like, it is required to use Tc that is measured at a temperature close to the heating rate for a heat treatment. Therefore, if treating at a heating speed other than those in the Examples, although the optimum heat-treatment temperature varies, it is desired that a heat treatment be conducted under the above-mentioned conditions with a Tc measured at the heating rate for a heat treatment being a standard.

The glass transition temperature (Tg) and the crystallization temperature (Tc) can be specified by means of a differential scanning calorimeter (Diamond DSC, manufactured by PerkinElmer Inc.) at a heating rate of 10° C./min.

The heating time is preferably 0.005 minute or more and 10 hours or less, further preferably 0.005 minute or more and 5 hours or less, and particularly preferably 0.01 minute or more and 3 hours or less. If the heating time is shorter than 0.005 minute, heating may be insufficient. If the heating time exceeds 10 hours, the solid electrolyte may be deteriorated, resulting in lowering in ion conductivity.

No specific restrictions are imposed on the heating method. Heating may be conducted slowly or rapidly to a prescribed temperature.

It is preferred that the heat treatment be conducted at a dew point of −40° C. or less, more preferably at a dew point of −60° C. or less.

The pressure at the time of heating may be normal pressure or reduced pressure.

The atmosphere may be air or inert gas.

Further, as described in JP-A-2010-186744, heating may be conducted in a solvent.

The solid electrolyte or the solid electrolyte precursor may be in the form of a particle or in the form of a sheet. No specific restrictions are imposed on the shape.

It is preferred that the mean volume diameter (hereinafter referred to as the "particle diameter") of the solid electrolyte precursor be 0.01 μm or more and 500 μm or less.

4. Positive Electrode Mix Material

The material for a positive electrode mix of the invention comprises a material comprising a solid electrolyte and a material comprising a sulfur-based active material, wherein the solid electrolyte comprises a Li element or a Na element; a S element; and a halogen element selected from the group consisting of I, Br, Cl and F.

It is preferred that the solid electrolyte comprise a P element.

As the material comprising a solid electrolyte, a material comprising a solid electrolyte or a solid electrolyte precursor mentioned above can be given.

As the material comprising a sulfur-based active material, the sulfur-based active material mentioned above, or the like can be given.

The mixing ratio of the material comprising a solid electrolyte and the material comprising a sulfur can be appropriately adjusted according to the required performance.

5. Positive Electrode

The positive electrode of the invention is produced by using the positive electrode mix of the invention mentioned above as the raw material, or it contains the positive electrode mix. As for the method for producing the positive electrode of the invention, the positive electrode can be produced by a known method or by a method that will be developed in the future. For example, it can be formed by a method in which the positive electrode mix of the invention is subjected to press molding by a normal method, thereby to form a sheet-like electrode, or by other methods.

The positive electrode can be produced by subjecting the positive electrode mix of the invention mentioned above to an electrostatic method or a coating method.

The thickness of the positive electrode can be appropriately adjusted in accordance with the required performance of a lithium ion battery.

6. Lithium Ion Battery

It suffices that the lithium ion battery of the invention have the positive electrode obtained from the positive electrode mix of the invention mentioned above. As for other constituent elements such as the solid electrolyte layer, the negative electrode and the current collector, known elements can be used.

The solid electrolyte layer is a layer that comprises a solid electrolyte, and is preferably a layer in which solid electrolyte particles are fused to one another. Here, the "fused" means that part of the solid electrolyte particles is dissolved and the dissolved part is integrated with other solid electrolyte particles. The solid electrolyte layer may be in the form of a plate of the solid electrolyte. It includes a case where part or all of the solid electrolyte particles are dissolved to be in the form of a plate.

It is preferred that the thickness of the electrolyte layer be 0.001 mm or more and 1 mm or less.

As the solid electrolyte, a polymer-based solid electrolyte, an oxide-based solid electrolyte and a sulfur-based solid electrolyte can be given.

No specific restrictions are imposed on the polymer-based electrolyte. For example, as disclosed in JP-A-2010-262860, materials that can be used as a polymer electrolyte such as a fluorine resin, polyethylene oxide, polyacrynitrile, polyacrylate or its derivatives, copolymers or the like can be given.

As the fluorine resin, for example, those comprising vinilidene fluoride (VdF), hexafluoropropylene (HFP), tetrafluoroethylene (TFE) or the derivatives thereof as structural units can be given. Specifically, homopolymers such as vinylidene polyfluoride (PVdF), polyhexafluoropropylene (PHFP), polytetrafluoroethylene (PTFE), binary copolymers or tertiary copolymers such as copolymer of VdF and HFP (hereinafter, these copolymers may be referred to as "P(VdF-HFP)") can be given.

As the oxide-based oxide electrolyte, LiN, LISICONs, Thio-LISICONs and crystals having a Perovskites structure such as $La_{0.55}Li_{0.35}TiO_3$, $LiTi_2P_3O_{12}$ having a NASICON structure, and electrolytes obtained by crystallization of these can be used.

As the sulfide-based solid electrolyte, the glass ceramic solid electrolyte, the solid electrode precursor, glass ceramic obtained by crystallizing the solid electrolyte precursor by heating that are used in the positive electrode mix mentioned above or glass ceramic described in WO2007/066539A1 are preferable. It may be the glass ceramic solid electrolyte or a glass solid electrolyte that satisfies the formula (F) of the electrolyte precursor 3 mentioned above. The solid electrolyte disclosed in Patent Document 1 mentioned above may suffice. Specific examples will be given below.

(1) Constitutional Element and Constitutional Element Ratio

As the sulfide-based solid electrolyte that can be used in the electrolyte layer, a lithium ion conductive inorganic solid electrolyte having the composition shown in the formula (1) can be exemplified.

$$L_a M_b P_c S_d \qquad (1)$$

In the formula (1), L is Li or Na, preferably L is Li.

M is an element selected from B, Zn, Si, Cu, Ga or Ge.

a to d are independently the composition ratio of each element, and a:b:c:d is 1 or 12:0 to 0.2:1:2 to 9.

Preferably, b is 0, more preferably, the ratio of a, c and d (a:c:d) is a:c:d=1 to 9:1:3 to 7, further preferably a:c:d=1.5 to 4:1:3.25 to 4.5.

As described below, the composition ratio of each element can be controlled by adjusting the amount of the raw material compounds used when producing a sulfide-based solid electrolyte.

(2) Crystallization

The sulfide-based solid electrolyte may be amorphous (glass) or crystallized (glass ceramic). Only part of the solid electrolyte may be crystallized.

Here, if crystallized, there may be a case where the ion conductivity thereof becomes higher than that of glass. In this case, it is preferred that it be crystallized.

(i) Crystal Structure

As the crystal structure, for example, the $Li_7PS_6$ structure, the $Li_4P_2S_6$ structure, the $Li_3PS_4$ structure, the $Li_4SiS_4$ structure or the $Li_2SiS_3$ structure disclosed in JP-A-2002-109955 and the $Li_7P_3S_{11}$ structure disclosed in JP-A-2005-228570 or WO2007/066539 are preferable.

Here, the $Li_7P_3S_{11}$ structure has a peak, in the X-ray diffraction (CuKα:λ=1.5418 Å), at 2θ=17.8±0.3 deg, 18.2±0.3 deg, 19.8±0.3 deg, 21.8±0.3 deg, 23.8±0.3 deg, 25.9±0.3 deg, 29.5±0.3 deg and 30.0±0.3 deg.

The reason therefor is that, by the above crystal structure, the ion conductivity becomes higher than that of an amorphous body.

The crystallized part of the sulfide-based solid electrolyte may comprise only one crystal structure or may comprise a plurality of crystal structures.

As the crystal structure, the $Li_7P_3S_{11}$ structure is most preferable due to its high ion conductivity.

(ii) Crystallization Degree (a) Preferable Range of Crystallization Degree

The crystallization degree of the sulfide-based solid electrolyte (the crystallization degree of a crystal structure of which the ion conductivity is higher than that of an amorphous body) is preferably 50% or more, more preferably 60% or more.

The reason is that, if the crystallization degree of the sulfide-based solid electrolyte is less than 50%, the effect of increasing the ion conductivity by crystallization becomes less significant.

(b) Method for Measuring Crystallization Degree

The degree of crystallization can be measured by means of an NMR spectrum apparatus. Specifically, the solid $^{31}$P-NMR spectrum of the sulfide-based solid electrolyte is measured, and for the resulting spectrum, the resonance line observed at 70 to 120 ppm is separated into a Gaussian curve by using the nonlinear least-squares method, and the ratio of areas of each curve is obtained.

It is preferred that the negative electrode layer comprise a negative electrode active material, an electrolyte and a conductive aid. It may contain a binder. The formation method or the thickness is the same as that of the positive electrode.

As the negative electrode active material, a material into which lithium ions can be inserted or from which lithium ions can be removed or a material known as a negative electrode active material in the field of a battery can be used.

For example, a carbon material; specifically, artificial graphite, graphite carbon fibers, resin baked carbon, thermally decomposed vapor-grown carbon, coke, mesocarbon microbeads (MCMB), furfuryl alcohol resin baked carbon, polyacene, pitch-based carbon fibers, vapor-grown carbon fibers, natural graphite, hardly graphitizable carbon or the like can be given. A mixture of these may be used. Of them, artificial graphite is preferable.

In addition, a metal such as lithium, indium, aluminum and silicon or an alloy obtained by combining these metals with other elements and compounds can be used as a negative electrode material. Among them, silicon, tin and lithium having a high theoretical capacity are preferable.

The electrolyte and the conductive aid are the same as those for the positive electrode mix or the electrolyte layer mentioned above.

As the current collector, a plate-like, foil-like, a network-like current collector made of stainless steel, gold, platinum, copper, zinc, nickel, tin, aluminum or an alloy thereof.

The lithium ion battery of the invention can be produced by a known method. For example, it can be produced by a coating method or an electrostatic method (electrostatic spray method, electrostatic screen method or the like).

EXAMPLES

Production Example 1 [Production of Lithium Sulfide]

The production and purification of lithium sulfide were conducted in the same manner as in the example of WO2005/040039A1. Specifically, it was conducted as follows.

(1) Production of Lithium Sulfide

In a 10 liter-autoclave with a stirring blade, 3326.4 g (33.6 mol) of N-methyl-2-pyrrolidone (NMP) and 287.4 g (12 mol) of lithium hydroxide were charged. The mixture was heated to 130° C. at 300 rpm. After heating, hydrogen sulfide was injected into the mixture for 2 hours at the supply rate of 3 liter/minute.

Subsequently, the reaction liquid was heated under a stream of nitrogen (200 cc/min), and a part of the reacted hydrogen sulfide was subjected to desulfurization. With the temperature being raised, water generated as a by-product by reacting hydrogen sulfide and lithium hydroxide mentioned above began to evaporate. This water was concentrated by using a condenser and removed out of the system. Simultaneously with removal of water by distillation, the temperature of the reaction liquid elevated. Heating was stopped at the time where the temperature reached 180° C., and then the liquid was maintained at a certain temperature. After completion of the desulfurization reaction (for about 80 minutes), the reaction was completed to obtain lithium sulfide.

(2) Purification of Lithium Sulfide

NMP in 500 mL of a slurry reaction solution (NMP-lithium sulfide slurry) obtained in (1) mentioned above was subjected to decantation. After that, 100 mL of dehydrated NMP was added thereto, and stirred for about one hour at 105° C. While the temperature being kept, NMP was subjected to decantation. Further, 100 mL of NMP was added, and stirring at 105° C. was conducted for about one hour, followed by decantation of NMP while the temperature being kept. A series of the procedure was repeated 4 times in total. After completion of decantation, lithium sulfide was dried under normal pressure for 3 hours at 230° C. (above the boiling point of NMP) under a stream of nitrogen. The content of impurity in lithium sulfide obtained was measured.

The contents of each of the sulfur oxides such as lithium sulfite ($Li_2SO_3$), lithium sulfate ($Li_2SO_4$) and thiosulfuric acid dilithium ($Li_2S_2O_3$), as well as lithium N-methylaminobutyrate (LMAB) were measured quantitatively according to ion chromatography. As a result, the total content of sulfur oxides was 0.13 mass %, and the content of LMAB was 0.07 mass %.

Example 1

(1) Preparation of Electrolyte Precursor [Sulfide Glass; Molar Rate: $Li_2S/P_2S_5/LiI=64.2/21.4/14.4$] and Heat-Treated Electrolyte As raw materials, 0.306 g ($6.66\times10^{-3}$ mol) of lithium sulfide produced in Production Example 1, 0.494 g ($2.22\times10^{-3}$ mol) of phosphorus pentasulfide (manufactured by Sigma-Aldrich) and 0.200 g ($1.49\times10^{-3}$ mol) of lithium iodide (manufactured by Sigma-Aldrich) were used.

Powder obtained by mixing these and 10 balls made of zirconia, each having a diameter of 10 mm were put in an alumina pot of a planetary ball mill (P-7; manufactured by Fritsch) and completely closed. The operation was conducted in a glove box in an atmosphere of argon with a dew point of −80° C. or less.

For initial several minutes, the planetary ball mill was rotated at a low speed (85 rpm) to mix the blend powder sufficiently. Thereafter, the rotation speed of the planetary ball mill was raised gradually to 370 rpm. With the rotation speed of the planetary ball mill being 370 rpm, mechanical milling was conducted for 20 hours. The powder obtained by mechanical milling was evaluated by X-ray measurement. As a result, the powder was confirmed to be glass (sulfide glass).

The crystallization temperature (Tc) of the electrolyte precursor was 189° C. Tc was measured by DSC (differential scanning calorimeter).

The electrolyte precursor was heat-treated at 210° C. for 2 hours to prepare a heat-treated solid electrolyte (glass ceramic).

For the glass ceramic obtained, the result of $^{31}$P-NMR spectrum measurement, the ion conductivity σ and the average of hydrogen sulfide concentration are shown in Table 1.

TABLE 1

| Position of peak in P-NMR (ppm) | | | Peak intensity ratio | | Ion conductivity | Average of hydrogen sulfide concentration |
|---|---|---|---|---|---|---|
| First peak | Second peak | Other peak | | | | |
| (I1) | (I2) | (Ic) | I2/I1 | Ic/I1 | S/cm | ppm |
| 78 | 90 | 102 | 2.3 | 0.12 | $2.4\times10^{-3}$ | 13.8 |

The measurement method is as follows.

(A) $^{31}$P-NMR Spectrum

The measurement was conducted at room temperature with a 5 mm CP/MAS probe being attached to a JNM-CMXP302 NMR apparatus manufactured by JEOL Ltd. The $^{31}$P-NMR spectrum was measured by the single pulse method (90° pulse 4 μs, magic angle spinning: 8.6 kHz).

The chemical shift was determined by using ammonium hydrogen phosphate as an external standard (1.3 ppm). The measurement range was from 0 ppm to 150 ppm.

(B) Ion Conductivity (σ)

A sample was formed to a shape having a cross-section surface with a diameter of 10 mm (cross-section area S=0.785 cm$^2$), and a height (L) of 0.1 to 0.3 cm. Electrode terminals were attached to the upper and bottom side of the sample piece obtained, respectively, and a measurement was conducted by the alternating current impedance method (frequency range: 5 MHz to 0.5 Hz, amplitude: 10 mV) to obtain a Cole-Cole plot. The real part Z' (Ω) at the point where −Z" (Ω) was the smallest near the right end of a circular arc observed in the higher-frequency region was set to the bulk resistance R (Ω) of an electrolyte. With the bulk resistance, according to the following formula, the ion conductivity σ (S/cm) was calculated.

$$R=\rho(L/S)$$

$$\sigma=1/\rho$$

In this example, the measurement was conducted with the distance of a lead being about 60 cm.

(C) Average of Hydrogen Sulfide Concentration (Ppm)

The measurement device shown in FIG. 4 was used.

A sample for the measurement was sufficiently pulverized by means of a mortar in a glove box with nitrogen under a circumstance of a dew point of −80° C. 0.1 g of the pulverized sample was encapsulated in a 100 ml-Schlenk bottle.

Next, air passed through water (wet air) was circulated in the Schlenk bottle at 500 ml/min. The temperature of wet air was 25° C., and the humidity thereof was 80 to 90%.

Gas released from the Schlenk bottle between 1 minute and 1 minute 45 seconds after the start of circulation was collected to obtain a first sample gas. The hydrogen sulfide concentration of the sample gas was calculated by determining quantitatively the sulfur content thereof by the ultraviolet fluorescent method using TS-100 (manufactured by Mitsubishi Chemical Analytech Co., Ltd). Meanwhile, the sample gas was analyzed qualitatively by means of gas chromatography by using Agilent 6890 (provided with a sulfur selective detector (SIEVERS355)). As a result, 99% or more of the sulfur content was confirmed to be a hydrogen sulfide gas.

For gases released from a Schlenk bottle between 5 minutes to 5 minutes 45 seconds after the starts of circulation, between 10 minutes to 10 minutes 45 seconds after the start of circulation, between 20 minutes to 20 minutes 45 seconds after the start of circulation and between 60 minutes to 60 minutes 45 seconds after the start of circulation, the measurement was conducted as in the case of the first sample gas.

The average value (ppm) of the hydrogen sulfide concentration was determined from the hydrogen sulfide concentrations and the measurement time.

(2) Production of Sulfur-Based Active Material (Composite of Sulfur-Based Active Material and Porous Carbon)

0.500 g of sulfur (manufactured by Sigma-Aldrich, purity: 99.998%) and 0.214 g of porous carbon (Ketjen black (KB), EC600JD, manufactured by Lion Corporation) were mixed in a mortar. The mixture was put in a sealable stainless-made apparatus and subjected to a heat treatment in an electronic furnace. The heating conditions were as follows. The temperature was elevated from room temperature to 150° C. at 10° C./min and retained at 150° C. for 6 hours. Then, the temperature was elevated to 300° C. at 10° C./min, retained for 2.75 hours, followed by natural cooling to obtain a composite.

The space ratio $\epsilon_r$ associated with the elastic recovery of the composite was measured by using the apparatus shown in FIG. 1, and was found to be 0.013. The weight m of the composite was 0.1 g, the true density $\rho_p$ was 2.01 g/cm$^3$, and the height L of the composited after releasing the pressurizing by means of the pressurizing rod was found to be 0.38 mm.

The pore volume of pores having a pore diameter of 100 nm or less of Ketjen black was 2.7 cc/g, the average pore diameter of Ketjen black was 12.7 nm and the BET specific surface area was 1365 m$^2$.

(3) Preparation of Positive Electrode Mix 0.5 g of the electrolyte precursor powder prepared in (1) above and 0.5 g of the sulfur-based active material composite prepared in (2) above were put in a mill pot, and the mixture was subjected to a mechanical milling treatment by means of a planetary ball mill (P-7, manufactured by Fritsch) in an argon atmosphere at room temperature (25° C.) at a rotational speed of 370 rpm for 5 hours.

In an oven that had been controlled to 210° C., 0.5 g of the mixture after the mechanical milling treatment was quickly sandwiched between two stainless plates that had been heated to 210° C. in advance, and the resultant was allowed to stand for 10 minutes. By sandwiching between the heated metal plate, the sample was reached to 210° C. for about 2 minutes. Thereafter, the sample was air-cooled, whereby a positive electrode mix was obtained.

Example 2

In (3) of Example 1, the mixture after the mechanical milling was placed in a SUS-made apparatus, and set in an oven that had been controlled to 210° C. in advance. After allowing to stand as it is for 2 hours, the mixture was air-cooled, whereby a positive electrode mix was obtained.

Example 3

A positive electrode mix was prepared in the same manner as in Example 1, except that activated carbon (MSC30, manufactured by Kansai Coke and Chemicals, Co., Ltd.) was used instead of the porous carbon in (2) of Example 1.

The pore volume of pores having a pore diameter of 100 nm or less of the activated carbon was 1.6 cc/g, the average pore diameter was 2.3 nm and the BET specific surface area was 2841 m$^2$.

Example 4

A positive electrode mix was prepared in the same manner as in Example 2, except that the activated carbon (MSC30, manufactured by Kansai Coke and Chemicals, Co., Ltd.) was used instead of the porous carbon in (2) of Example 1.

Example 5

(1) Preparation of Electrolyte Precursor [Sulfide Glass: Molar Ratio Li$_2$S/P$_2$S$_5$/LiBr=64.2/21.4/14.4] and Heat-Treated Solid Electrolyte The electrolyte precursor was prepared in the same manner as in Example 1(1), except that, as the raw material, 0.329 g (7.16×10$^{-3}$ mol) of lithium sulfide produced in Production Example 1, 0.532 g (2.39×10$^{-3}$ mol) of phosphorus pentasulfide (manufactured by Sigma-Aldrich) and 0.140 g (1.61×10$^{-3}$ mol) of lithium bromide (manufactured by Sigma-Aldrich) were used.

This electrolyte precursor was subjected to a heat-treatment at 230° C. for 10 minutes, whereby a heat-treated solid electrolyte (glass ceramic) was prepared.

For the glass ceramic obtained, the result of $^{31}$P-NMR spectrum measurement, ion conductivity σ and average of hydrogen sulfide concentration were shown in Table 2.

TABLE 2

| Position of peak in P-NMR (ppm) | | | | | Ion conductivity | Average of hydrogen sulfide concentration |
|---|---|---|---|---|---|---|
| First peak | Second peak | Other peak | Peak intensity ratio | | | |
| (I1) | (I2) | (Ic) | I2/I1 | Ic/I1 | S/cm | ppm |
| 77.7 | 88.0 | 107.7 | 2.57 | 0.27 | 2.1 × 10$^{-3}$ | 8.0 |

(2) Preparation of Positive Electrode Mix

A positive electrode mix was prepared in the same manner as in Example 3, except that, in Example 3, as the solid electrolyte precursor, one prepared in (1) above was used.

Example 6

The positive electrode mix was prepared in the same manner as in Example 5, except that, in Example 5, the heat-treatment conditions after the mechanical milling were changed to 230° C. and 10 minutes.

Comparative Example 1

(1) Preparation of Glass Ceramic Solid Electrolyte (Li$_2$S/P$_2$S$_5$=70/30)

A glass ceramic solid electrolyte was produced in accordance with Example 1 of WO07/066,539.

Specifically, the solid electrolyte was produced in the same manner as in Example 1(1), except that 0.325 g (0.00707 mol) of lithium sulfide and 0.675 g (0.00303 mol) of phosphorus pentasulfide (manufactured by Sigma Aldrich) were used as the raw material.

White yellow powder obtained after the mechanical milling treatment was evaluated by X-ray measurement. As a result, it was confirmed that the powder was vitrified (sulfide-based glass).

0.5 g of the resulting sulfide-based glass was put in a SUS-made apparatus, and set in an oven of which the temperature had been controlled to 300° C. in advance. After allowing the glass to stand as it is for 2 hours, the glass was air-cooled, whereby a glass ceramic solid electrolyte was obtained.

(2) Preparation of Positive Electrode Mix 0.5 g of the glass ceramic solid electrolyte prepared in (1) above and 0.5 g of the sulfur-based active material composite prepared in Example 1(2) above were put in a mill pot, and the mixture was subjected to a mechanical milling treatment by means of a planetary ball mill (P-7, manufactured by Fritsch) in an argon atmosphere at room temperature (25° C.) at a rotational speed of 370 rpm for 5 hours, whereby a positive electrode mix was obtained.

Comparative Example 2

A positive electrode mix was prepared in the same manner as in Comparative Example 1, except that the following glass solid electrolyte (sulfide-based glass: $Li_2S/P_2S_5=75/25$) was used instead of the glass ceramic solid electrolyte.

Production of Glass Solid Electrolyte (Sulfide-Based Glass: $Li_2S/P_2S_5=75/25$)

A glass solid electrolyte was produced in the same manner as in Comparative Example 1(1), except that 0.383 g (0.00833 mol) of lithium sulfide and 0.618 g (0.00278 mol) of phosphorus pentasulfide (manufactured by Sigma Aldrich) were used as the raw material. White yellow powder was evaluated by an X-ray measurement. As a result, it was confirmed that the powder was vitrified (sulfide-based glass).

Comparative Example 3

A positive electrode mix was prepared in the same manner as in Comparative Example 1, except that, activated carbon (MSC30, manufactured by Kansai Coke and Chemicals, Co., Ltd.) was used instead of the porous carbon in the preparation of a sulfur-based material composite.

Comparative Example 4

A positive electrode mix was prepared in the same manner as in Comparative Example 2, except that, activated carbon (MSC30, manufactured by Kansai Coke and Chemicals, Co., Ltd.) was used instead of the porous carbon in the preparation of a sulfur-based material composite.

Evaluation Example 1

A lithium ion battery was prepared by using the positive electrode mix prepared in the Examples and the Comparative Examples given above.

60 mg of the glass ceramic solid electrolyte prepared in Comparative Example 1(1) was put in a plastic-made cylinder having a diameter of 10 mm, followed by compression molding. Next, 6.9 mg of the prepared positive electrode mix was put, and compression molding was conducted again. On the surface opposite to the positive electrode mix, indium foil (thickness: 0.3 mm, 9.5 mmφ) and lithium foil (thickness: 0.2 mm, 9.5 mmφ) were put to prepare a three-layer structure of the positive electrode, the solid electrolyte layer and the negative electrode, whereby a lithium ion battery was prepared.

For the lithium-ion battery produced, a constant current charge-discharge test was conducted at a charge-discharge current density of 0.500 mA/cm², at a charge-discharge voltage of 0.7 to 2.2V, and at a charge-discharge temperature of 25° C. After charging to 2.2V at a current density of 0.500 mA/cm², a similar test was conducted taking the discharge current density as 10 mA/cm². A discharge voltage ($V_{10}$) 10 seconds after the start of the discharge when discharge was conducted at a current density of 10 mA/cm² was evaluated.

The composition of the raw material, the heat-treatment conditions and $V_{10}$ of the positive electrode mix are shown in Table 3.

TABLE 3

| | Sulfur-based active material composite | | Electrolyte | | | |
|---|---|---|---|---|---|---|
| | Sulfur wt % | Carbon (type) wt % | precursor Type | wt % | Heat treatment after MM | $V_{10}$ (V) |
| Example 1 | 35 | 15 (KB) | A | 50 | 210° C., 10 min | 1.054 |
| Example 2 | 35 | 15 (KB) | A | 50 | 210° C., 2 h | 1.016 |
| Example 3 | 35 | 15 (MSC) | A | 50 | 210° C., 10 min | 1.144 |
| Example 4 | 35 | 15 (MSC) | A | 50 | 210° C., 2 h | 1.077 |
| Example 5 | 35 | 15 (MSC) | D | 50 | 210° C., 10 min | 1.133 |
| Example 6 | 35 | 15 (MSC) | D | 50 | 230° C., 10 min | 1.122 |
| Comp. Ex. 1 | 35 | 15 (KB) | B | 50 | Not conducted | 0.910 |
| Comp. Ex. 2 | 35 | 15 (KB) | C | 50 | Not conducted | 0.920 |
| Comp. Ex. 3 | 35 | 15 (MSC) | B | 50 | Not conducted | 1.040 |
| Comp. Ex. 4 | 35 | 15 (MSC) | C | 50 | Not conducted | 0.980 |

Type of carbon KB: Ketjen black, MSC: activated carbon
Type of electrolyte precursor
A: Glass solid electrolyte [$Li_2S/P_2S_5/LiI$ = 64.2/21.4/14.4]
B: Glass ceramic solid electrolyte ($Li_2S/P_2S_5$ = 70/30)
C: Glass solid electrolyte ($Li_2S/P_2S_5$ = 75/25)
D: Glass solid electrolyte ($Li_2S/P_2S_5/LiBr$ = 64.2/21.4/14.4)

From Table 3, it can be understood that the voltage after 10 seconds from the start of discharge ($V_{10}$) was increased if the positive electrode mix contained a halogen. The reason therefor is assumed that the internal resistance of the battery was reduced. The results reveal that presence of a halogen in the positive electrode mix leads to an increase in energy density of a battery and an increase in input. If an activated carbon is contained instead of Ketjen black, the voltage 10 seconds after the start of the discharge ($V_{10}$) was increased.

The above-mentioned comparative examples are not known.

INDUSTRIAL APPLICABILITY

The positive electrode material of the invention is suited for a positive electrode in a lithium-ion battery. The lithium-ion battery of the invention can be used as a battery for a handheld terminal, a handheld electronic device, a household compact power storage unit, a motorcycle using a motor as a power source, an electric automobile, a hybrid electric vehicle or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and a Japanese application on the basis of which the present application claims Paris convention priority are incorporated herein by reference in its entirety.

The invention claimed is:

1. A positive electrode mix comprising a solid electrolyte and a sulfur-based active material,
   wherein the solid electrolyte comprises a Li element or a Na element; a S element; a P element; and a halogen element selected from the group consisting of I, Br, Cl and F,
   the solid electrolyte has, in a $^{31}$P-NMR spectrum, a first peak in a first peak range of 75.0 ppm or more and 80.0 ppm or less, and
   a ratio of the intensity of a peak which is in a range other than the first peak range and an optional second peak range of 86.0 ppm or more and 92.0 ppm or less relative to the intensity of the first peak is 0.5 or less.

2. The positive electrode mix according to claim 1, wherein the solid electrolyte comprises a crystalline component.

3. The positive electrode mix according to claim 1, wherein, in the $^{31}$P-NMR spectrum, the solid electrolyte has a peak in the first peak range and the second peak range, respectively.

4. The positive electrode mix according to claim 1, wherein the peak intensity ratio ($I_2/I_1$) of the intensity of a second peak ($I_2$) in the second peak range relative to the intensity of the first peak ($I_1$) is 1 or more and 10 or less.

5. The positive electrode mix according to claim 4, wherein the halogen element is selected from the group consisting of I, Br and Cl.

6. The positive electrode mix according to claim 5, wherein the sulfur-based active material is a single substance of sulfur or lithium sulfide.

7. The positive electrode mix according to claim 6, comprising a conductive material that comprises fine pores,
   wherein the conductive material is carbon,
   the fine pore capacity of the conductive material is 0.1 cc/g or more and 5.0 cc/g or less, and
   the average diameter of the fine pores is 0.1 nm or more and 100 nm or less.

8. The positive electrode mix according to claim 4, wherein the sulfur-based active material is a single substance of sulfur or lithium sulfide.

9. The positive electrode mix according to claim 1, wherein the halogen element is selected from the group consisting of I, Br and Cl.

10. The positive electrode mix according to claim 1, wherein the sulfur-based active material is a single substance of sulfur or lithium sulfide.

11. The positive electrode mix according to claim 1, wherein the solid electrolyte contains a crystalline component,
    in the $^{31}$P-NMR spectrum, the solid electrolyte has a peak in the first peak range and the second peak range, respectively, and
    the halogen element is selected from the group consisting of I, Br and Cl.

12. The positive electrode mix according to claim 1, wherein the solid electrolyte contains a crystalline component,
    in the $^{31}$P-NMR spectrum, the solid electrolyte has a peak in the first peak range and the second peak range, respectively, and
    the sulfur-based active material is a single substance of sulfur or lithium sulfide.

13. The positive electrode mix according to claim 1, wherein the solid electrolyte is glass ceramic.

14. The positive electrode mix according to claim 13, wherein the solid electrolyte is selected from the group consisting of $Li_2S/P_2S_5/LiI$ and $Li_2S/P_2S_5/LiBr$.

15. A positive electrode comprising the positive electrode mix according to claim 5.

16. A lithium ion battery comprising the positive electrode according to claim 15.

* * * * *